United States Patent
Lee et al.

(10) Patent No.: US 12,517,551 B2
(45) Date of Patent: Jan. 6, 2026

(54) FOLDABLE GLASS AND ELECTRONIC DEVICE INCLUDING THE SAME

(71) Applicant: SAMSUNG ELECTRONICS CO., LTD., Suwon-si (KR)

(72) Inventors: Hosoon Lee, Suwon-si (KR); Wonsun Lee, Suwon-si (KR); Hyunsuk Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 180 days.

(21) Appl. No.: 17/895,141

(22) Filed: Aug. 25, 2022

(65) Prior Publication Data
US 2023/0038532 A1    Feb. 9, 2023

Related U.S. Application Data

(63) Continuation of application No. PCT/KR2022/010013, filed on Jul. 11, 2022.

(30) Foreign Application Priority Data

Aug. 5, 2021    (KR) .................. 10-2021-0103138

(51) Int. Cl.
  *G06F 1/16*    (2006.01)
(52) U.S. Cl.
  CPC .......... *G06F 1/1652* (2013.01); *G06F 1/1643* (2013.01); *G06F 1/1681* (2013.01)
(58) Field of Classification Search
  CPC ......... B32B 3/266; B32B 17/06; B32B 17/10; G02F 1/33305; G06F 1/1616;
  (Continued)

(56) References Cited

U.S. PATENT DOCUMENTS

| 9,423,639 B2 | 8/2016 | Hongo et al. |
| 10,833,106 B2 | 11/2020 | Ke |

(Continued)

FOREIGN PATENT DOCUMENTS

| KR | 1020150017819 A | 2/2015 |
| KR | 1020160111597 A | 9/2016 |

(Continued)

OTHER PUBLICATIONS

Machine translation of KR 20210028830 via EPO (Year: 2021).*

(Continued)

*Primary Examiner* — Laura C Powers
*Assistant Examiner* — Rebecca L Grusby
(74) *Attorney, Agent, or Firm* — CANTOR COLBURN LLP

(57) ABSTRACT

An electronic device including a hinge part, housings rotatable around the hinge part; and a foldable glass facing the housings and foldable together with the pair of housings. The foldable glass including a pair of glass bodies spaced apart from one another along a first direction and respectively corresponding to the housings, a plurality of slits defined between the pair of glass bodies, and a plurality of bridges defining the plurality of slits and including a plurality of main bridges between slits adjacent to each other along the first direction, and a plurality of sub bridges connecting two adjacent main bridges among the plurality of main bridges to each other, or connecting any one of the plurality of main bridges to the glass body.

14 Claims, 13 Drawing Sheets

(58) Field of Classification Search
CPC ...... G06F 1/1618; G06F 1/162; G06F 1/1652; G06F 1/1656; G06F 1/1681; G09F 9/301; H04M 1/0268; H04M 1/0269; H10K 77/10; H10K 77/111

See application file for complete search history.

(56) References Cited

U.S. PATENT DOCUMENTS

| | | | |
|---|---|---|---|
| 10,962,814 B2 | 3/2021 | Namkung et al. | |
| 2015/0043174 A1 | 2/2015 | Han et al. | |
| 2016/0295685 A1* | 10/2016 | Ryu | G06F 1/1641 |
| 2016/0357052 A1* | 12/2016 | Kim | G02F 1/133305 |
| 2018/0321708 A1 | 11/2018 | Wu et al. | |
| 2020/0313111 A1* | 10/2020 | Kim | G06F 1/1626 |
| 2020/0342789 A1 | 10/2020 | Park et al. | |
| 2021/0107826 A1 | 4/2021 | Hwang et al. | |
| 2022/0183174 A1* | 6/2022 | Bae | B32B 3/266 |
| 2022/0198965 A1* | 6/2022 | Yeon | G09F 9/301 |
| 2022/0404869 A1* | 12/2022 | Kim | G06F 1/1652 |
| 2024/0032229 A1* | 1/2024 | Han | H05K 5/0217 |
| 2024/0163356 A1* | 5/2024 | Bae | G06F 1/1681 |

FOREIGN PATENT DOCUMENTS

| | | |
|---|---|---|
| KR | 10-1834793 B1 | 3/2018 |
| KR | 102162567 B1 * | 10/2020 |
| KR | 102181655 B1 | 11/2020 |
| KR | 1020210028830 A | 3/2021 |
| WO | 2021029568 A1 | 2/2021 |

OTHER PUBLICATIONS

Machine translation of KR 102162567 via EPO (Year: 2020).*
Search Report dated Oct. 7, 2022 issued in the corresponding PCT application No. PCT/KR2022/010013.
European Search Report for European Patent Application No. 22853284.2 dated Aug. 6, 2024.

* cited by examiner

FOLDABLE GLASS AND ELECTRONIC DEVICE INCLUDING THE SAME

CROSS-REFERENCE TO RELATED APPLICATIONS

This application is a national stage application of International Application No. PCT/KR2022/010013 designating the United States, filed on Jul. 11, 2022, in the Korean Intellectual Property Receiving Office and claiming priority to Korean Patent Application No. 10-2021-0103138, filed on Aug. 5, 2021, in the Korean Intellectual Property Office, the disclosures of which are incorporated by reference herein in their entireties.

BACKGROUND

1. Field

The disclosure relates to a foldable glass and an electronic device including the same.

2. Description of Related Art

An electronic device has been gradually made slimmer, and has been improved in order to increase the rigidity of the electronic device, reinforce design aspects and also differentiate functional elements of the electronic device. The electronic device has been transformed from a uniform rectangular shape into a variety of shapes. The electronic device may have a deformable structure capable of providing a large-screen display while being convenient to carry. For example, the electronic device may include a foldable electronic device including at least two foldable housings that are used by being folded or unfolded with respect to each other. The foldable electronic device may include a foldable display that is at least partially foldable.

The foldable electronic device may include a hinge part, a first housing and a second housing that are rotatably connected to the hinge part, and a foldable display that is disposed on the first housing and the second housing. The foldable electronic device may be used where the first housing and the second housing are in-folded and/or out-folded in a range of 0 degrees to 360 degrees around the hinge part. The foldable display may include a foldable glass.

SUMMARY

A foldable glass within an electronic device may have a lattice pattern for implementing easy folding. A bridge provided between lattice pattern slits may assist in implementing the easy folding of the foldable glass. While the foldable glass is folded, distortion occurs at a bridge portion, and large stress may be applied to the portion thereof at which the distortion occurs. A technique for decreasing a magnitude of the stress occurring at a bending portion while the foldable glass is folded is required.

Example embodiments of the disclosure may provide a foldable glass and an electronic device including the same.

According to various example embodiments, an electronic device includes a hinge part 240, a pair of housings 210 and 220 coupled to the hinge part and folded around the hinge part to face each other, and a foldable glass 510 disposed on the pair of housings, where the foldable glass 510 includes a pair of glass bodies 511 spaced apart from one another, a first protection layer 517 covering one surface of the pair of glass bodies, a second protection layer 518 covering the other surface of the pair of glass bodies, a plurality of slits 512 provided between the pair of glass bodies 511, a plurality of main bridges 513 provided between two adjacent slits 512 among the plurality of slits 512, in a direction in which the pair of glass bodies are spaced apart from one another, and a plurality of sub bridges 514 connecting two adjacent main bridges among the plurality of main bridges, or connecting any one of the plurality of main bridges to the glass body.

According to various example embodiments, a foldable glass 510 includes a pair of glass bodies 511 spaced apart from one another in a first direction, a first protection layer 517 covering one surface of the pair of glass bodies, a second protection layer 518 covering the other surface of the pair of glass bodies, a plurality of slits 512 provided between the pair of glass bodies 511, a plurality of main bridges 513 provided between two adjacent slits 512, among the plurality of slits 512, in a direction in which the pair of glass bodies are spaced apart from one another, and a plurality of sub bridges 514 connecting two adjacent main bridges among the plurality of main bridges, or connecting any one of the plurality of main bridges to the glass body.

According to various example embodiments, an electronic device includes a hinge part 240, a pair of housings 210 and 220 rotatably coupled to the hinge part and folded around the hinge part to face each other, and a foldable glass 510 disposed on the pair of housings, where the foldable glass 510 includes a pair of glass bodies 511 spaced apart from one another in a first direction, a plurality of slits 512 provided between the pair of glass bodies 511, a plurality of main bridges 513 provided between two adjacent slits 512, among the plurality of slits 512, in a direction in which the pair of glass bodies are spaced apart from one another; and a plurality of sub bridges 514 connecting two adjacent main bridges among the plurality of main bridges 513, or connecting any one of the plurality of main bridges to the glass body.

Various example embodiments of the disclosure may provide a foldable glass and an electronic device including the same, capable of implementing a smooth folding, while having a level of thickness with no damage and no deformation of a shape when using a pen.

Various example embodiments of the disclosure may provide a foldable glass and an electronic device including the same, capable of implementing a main bridge and a sub bridge by irradiating laser on a portion at which a folding is implemented to phase change the corresponding portion and then performing an etching, and capable of decreasing distortion stress applied to the corresponding bridges during a folding operation.

In addition, various effects that are directly or indirectly understood through this disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
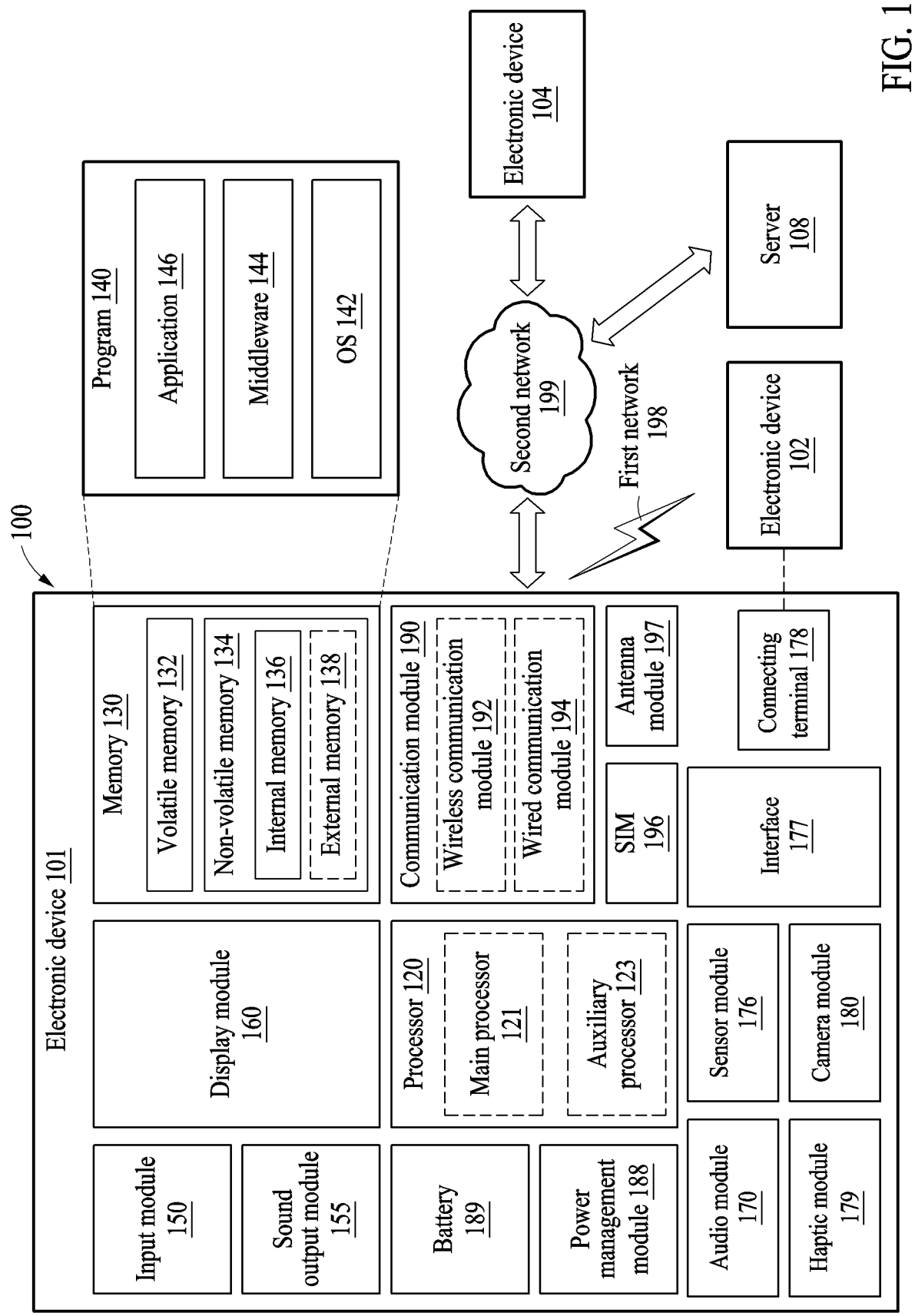
FIG. 1 is a block diagram illustrating, as an example, an electronic device in a network environment according to various example embodiments.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. As used herein, a reference number may indicate a singular element or a plurality of the element. For example, a reference number labeling a singular form of an element within the drawing figures may be used to reference a plurality of the singular element within the text of specification The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used in connection with various example embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
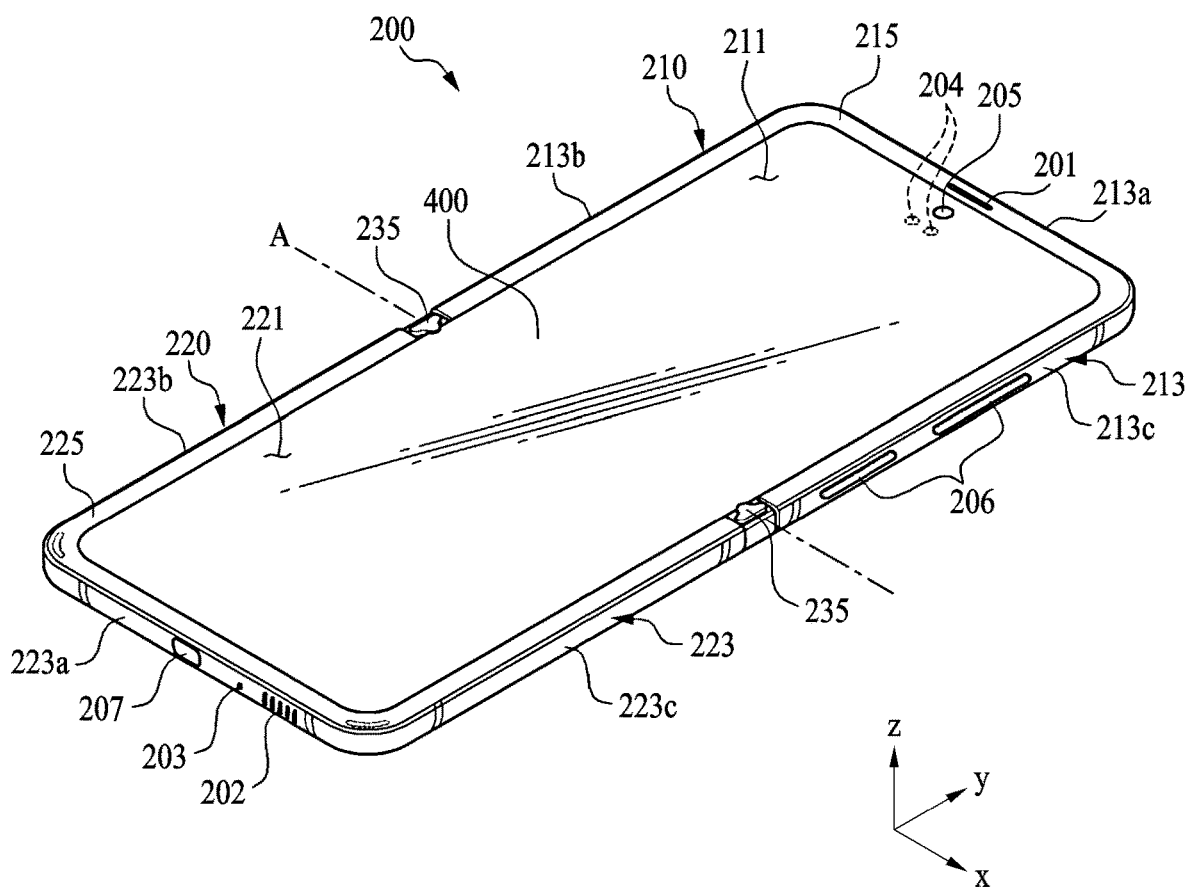
FIG. 2A is a front perspective view illustrating an electronic device in a flat state or an unfolded state according to an example embodiment.
Figure 2B:
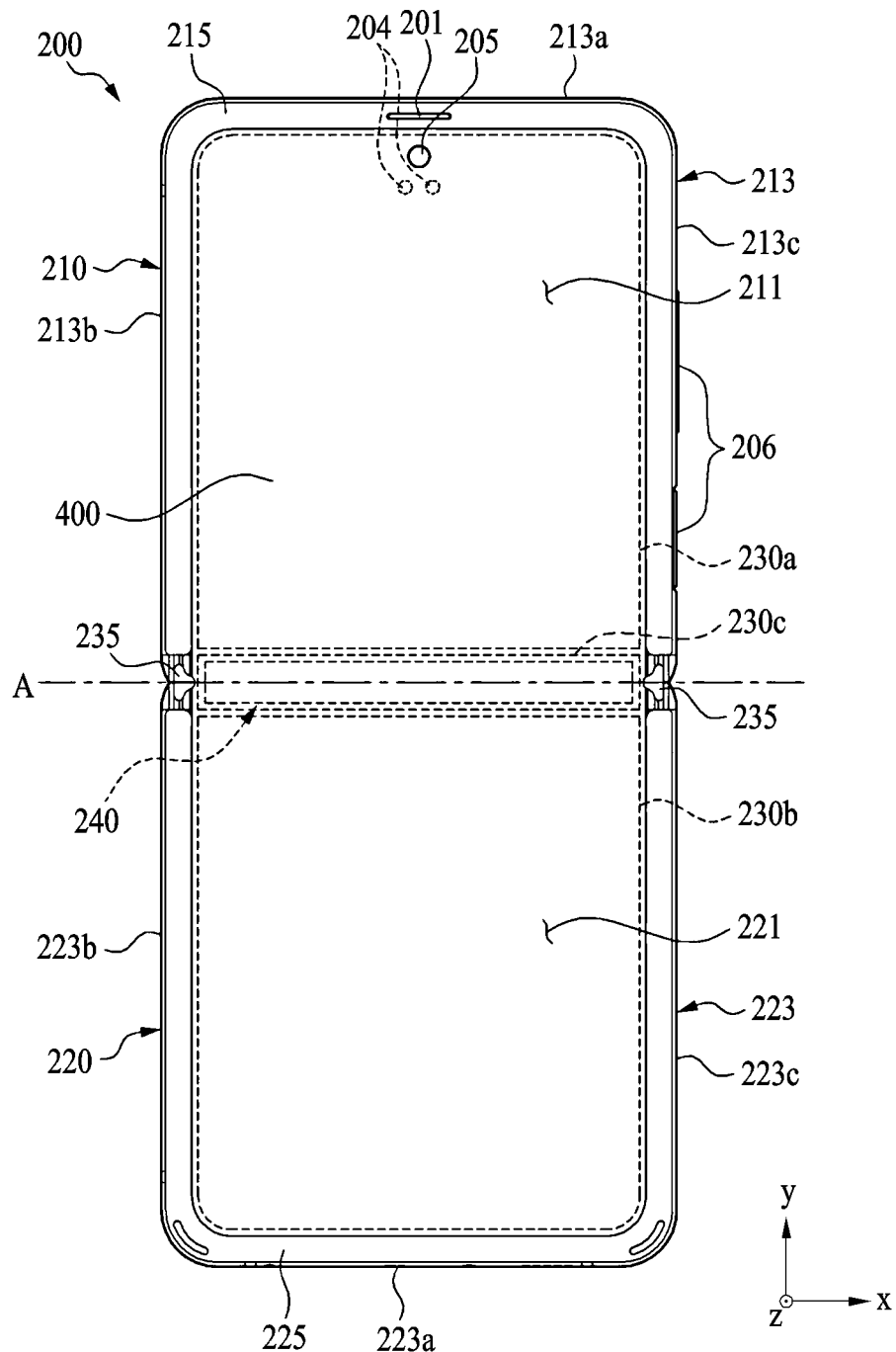
FIG. 2B is a top plan view illustrating a front side of an electronic device in a flat state or an unfolded state according to an example embodiment.
Figure 2C:
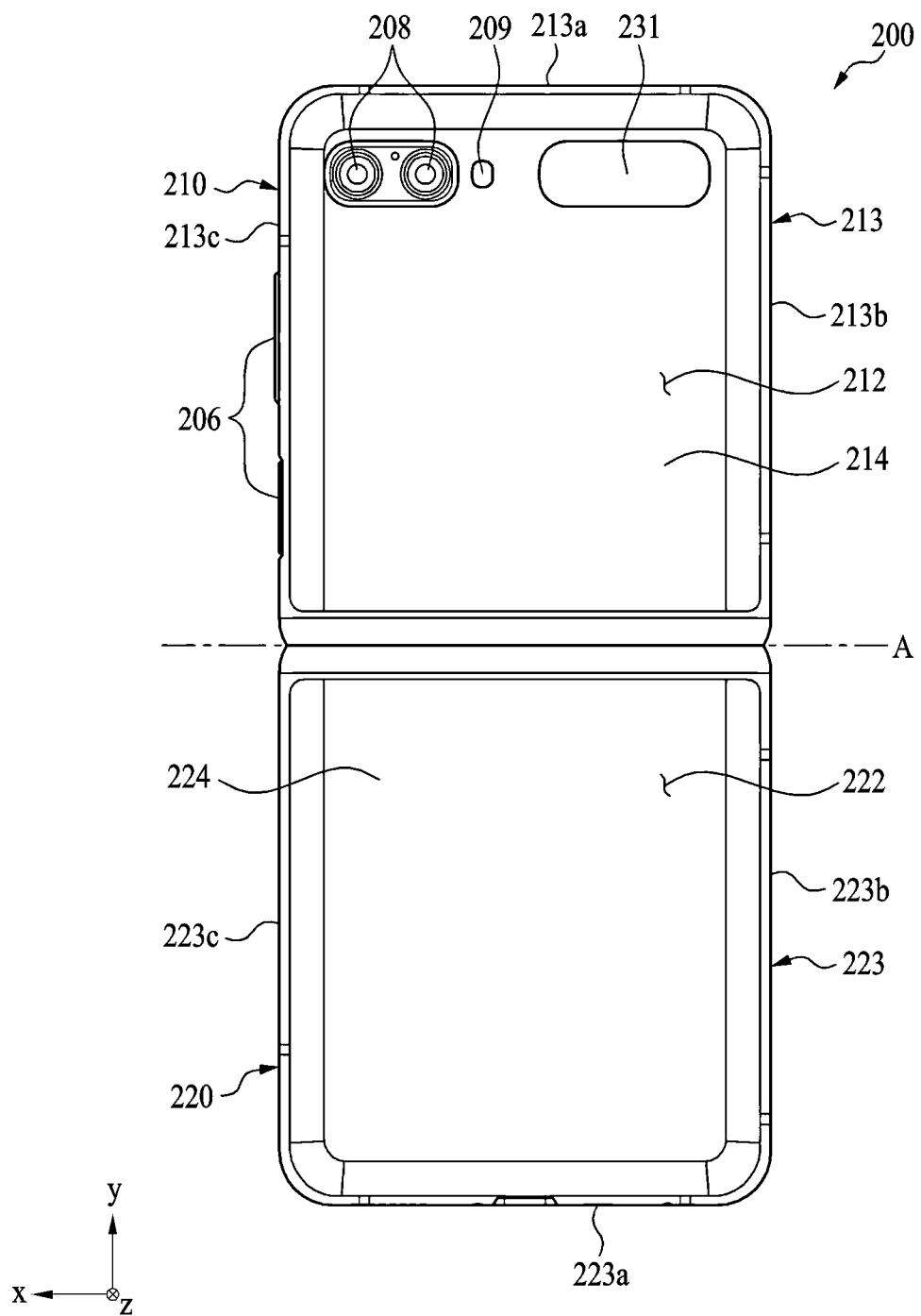
FIG. 2C is a top plan view illustrating a rear side of an electronic device in a flat state or an unfolded state according to an example embodiment.
Figure 2D:
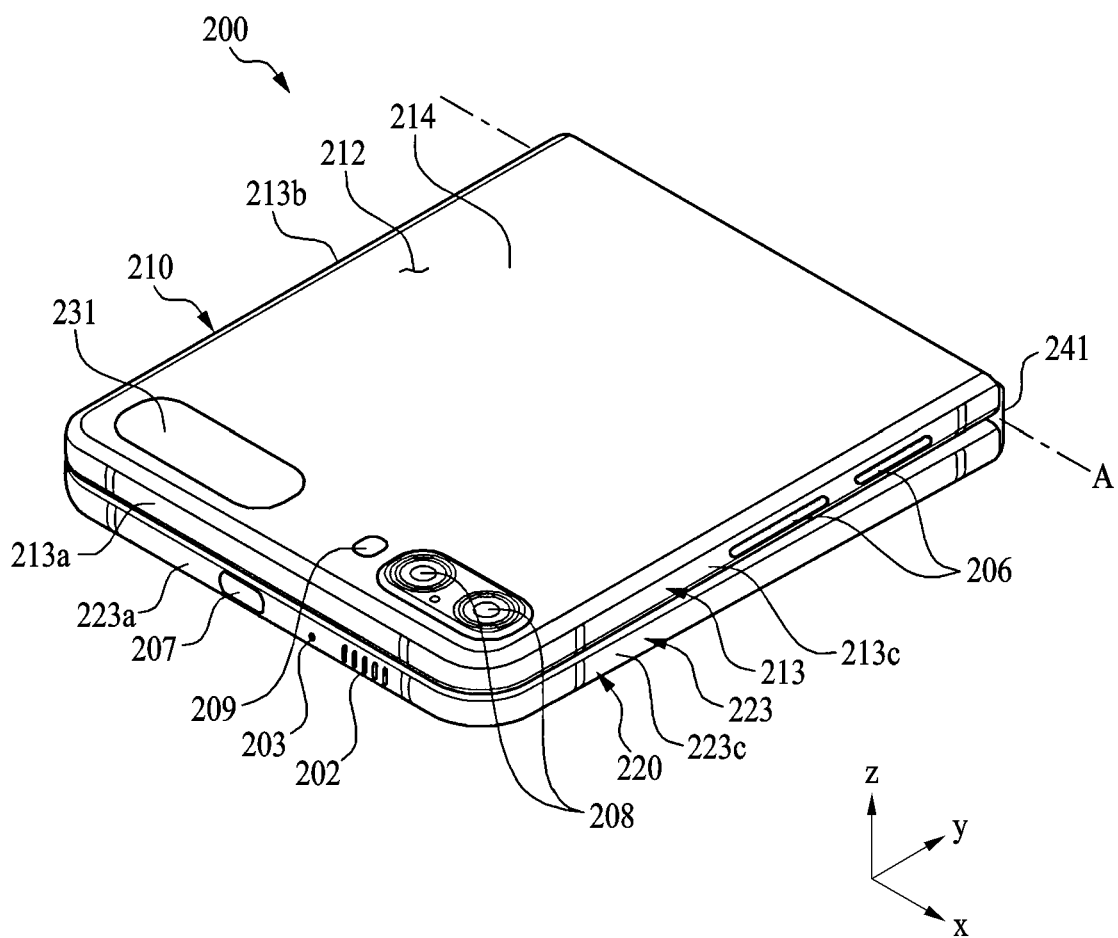
FIG. 2D is a perspective view illustrating an electronic device in a folded state according to an example embodiment.
Figure 2E:
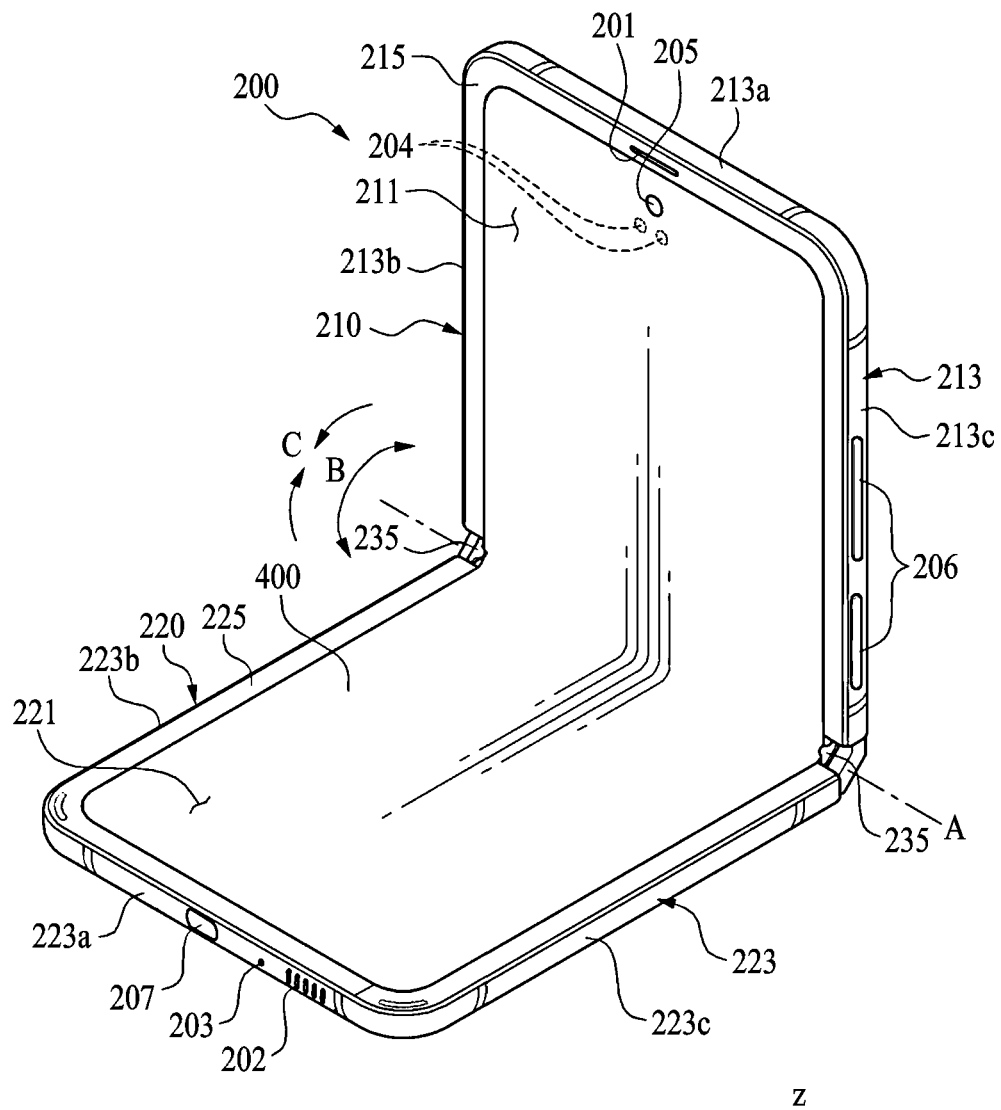
FIG. 2E is a perspective view illustrating an electronic device in an intermediate state according to an example embodiment.

FIG. 2A is a front perspective view illustrating an electronic device which is flat or unfolded (e.g., in a flat state or an unfolded state) according to various example embodiments. FIG. 2B is a top plan view illustrating a front side of an electronic device in a flat state or an unfolded state according to various example embodiments. FIG. 2C is a top plan view illustrating a rear side of an electronic device in a flat state or an unfolded state according to various example embodiments. FIG. 2D is a perspective view illustrating an electronic device which is folded (e.g., in a folded state) according to various example embodiments. FIG. 2E is a perspective view illustrating an electronic device which is partially folded (e.g., in an intermediate state) according to various example embodiments Referring to FIGS. 2A through 2E, in an example embodiment, an electronic device 200 (e.g., the electronic device 101 of FIG. 1) may include a pair of housings 210 and 220 (e.g., foldable housings) that are rotatably coupled to a hinge part and foldable to be folded around the hinge part to face each other (e.g., a hinge part 240 of FIG. 2B). In an example embodiment, the hinge part (e.g., the hinge part 240 of FIG. 2B) may be disposed extended to have a major dimension in an x-axis direction or in a y-axis direction. In an example embodiment, two or more hinge parts (e.g., the hinge part 240 of FIG. 2B) may be disposed to provide folding in the same direction or in different directions.

According to an example embodiment, the electronic device 200 may include a foldable display 400 disposed on the pair of housings 210 and 220. The electronic device 200 may be foldable at a bending region including a folding axis A. The electronic device 200 may include a non-bending region which is adjacent to the bending region and at which the electronic device 200 is non-bendable or remains flat even when the electronic device 200 is folded at the bending region. Various components or layers of the electronic device 200 may including a bending region to be foldable at the folding axis A, such as being foldable together with each other.

According to an example embodiment, the first housing 210 and the second housing 220 may be disposed at both sides (e.g., opposing sides) of the folding axis A and may substantially have symmetrical shapes with respect to the folding axis A. According to an example embodiment, an angle or a distance formed between the first housing 210 and the second housing 220 may vary depending on whether the electronic device 200 is in a flat state or an unfolded state, in a folded state, or in an intermediate state. In a flat state, the electronic device 200 may be disposed in a single plane defined by a first direction and a second direction crossing each other (e.g., the x-axis direction and the y-axis direction). A thickness direction of the electronic device 200 and various components or layers thereof, may extend along a third direction crossing each of the first and second directions.

According to various example embodiments, the pair of housings 210 and 220 may include the first housing 210 (e.g., a first housing structure) that is coupled to the hinge part (e.g., the hinge part 240 of FIG. 2B), and the second housing 220 (e.g., a second housing structure) that is coupled to the hinge part (e.g., the hinge part 240 of FIG. 2B). According to an example embodiment, the first housing 210 (or the foldable display 400) may include (or define) a first surface 211 and a second surface 212 which faces a direction opposite to the first surface 211, in the flat state or the unfolded state. According to an example embodiment, the second housing 220 may include a third surface 221 and a fourth surface 222, in the flat state or the unfolded state. According to an example embodiment, the electronic device 200 may be operated in a manner that the first surface 211 of the first housing 210 and the third surface 221 of the second housing 220 face substantially the same direction in the flat state or the unfolded state, and the first surface 211 and the third surface 221 face each other in the folded state. According to an example embodiment, the electronic device 200 may be operated in a manner that the second surface 212 of the first housing 210 and the fourth surface 222 of the second housing 220 face substantially the same direction in the flat state or the unfolded state, and the second surface 212 and the fourth surface 222 face opposite directions in the folded state.

According to various example embodiments, the first housing 210 may include a first side surface member 213 that at least partially forms an exterior of the electronic device 200, and a first rear surface cover 214 that is coupled to the first side surface member 213 and forms at least a portion of the second surface 212. According to an example embodiment, the first side surface member 213 may include a first side surface 213a, a second side surface 213b extending from one end (e.g., a first end) of the first side surface 213a, and a third side surface 213c extending from the other end (e.g., a second end) of the first side surface 213a which is opposite to the first end. According to an example embodiment, the first side surface member 213 may be formed in a rectangular (e.g., a square or an oblong) shape by the first side surface 213a, the second side surface 213b, and the third side surface 213c. The first side surface member 213 may be open at the folding axis A (or the hinge part 240), without being limited thereto.

According to various example embodiments, the second housing 220 may include a second side surface member 223 that at least partially forms an exterior of the electronic device 200, and a second rear surface cover 224 that is coupled to the second surface member 223, and forms at least a portion of the fourth surface 222 of the electronic device 200. According to an example embodiment, the second side surface member 223 may include a fourth side surface 223a, a fifth side surface 223b extending from one end of the fourth side surface 223a, and a sixth side surface 223c extending from the other end of the fourth side surface 223a. According to an example embodiment, the second side surface member 223 may be formed in a rectangular shape by the fourth side surface 223a, the fifth side surface 223b, and the sixth side surface 223c. The second side surface member 223 may be open at the folding axis A (or the hinge part 240), without being limited thereto.

According to various example embodiments, the pair of housings 210 and 220 are not limited to the illustrated shape and coupling, and may be implemented in other shapes or by the combination and/or coupling of other components. For example, in an example embodiment, the first side surface member 213 may be integrally formed with the first rear surface cover 214, and the second side surface member 223 may be integrally formed with the second rear surface cover 224.

According to various example embodiments, in the electronic device 200, the second side surface 213b of the first side surface member 213 may be connected to the fifth side surface 223b of the second side surface member 223 without a gap, in the flat state or the unfolded state. According to an example embodiment, in the electronic device 200, the third side surface 213c of the first side surface member 213 may be connected to the sixth side surface 223c of the second side surface member 223 without a gap, in the flat state or the unfolded state. According to an example embodiment, the electronic device 200 may be configured such that a sum of a length of the second side surface 213b and a length of the fifth side surface 223b in the y-axis direction, is greater than a length of the first side surface 213a and/or a length of the fourth side surface 223a in the x-axis direction, in the flat state or the unfolded state. Furthermore, the electronic device 200 may be configured such that a sum of a length of the third side surface 213c and a length of the sixth side surface 223c is greater than a length of the first side surface 213a and/or a length of the fourth side surface 223a.

According to various example embodiments, the first side surface member 213 and/or the second side surface member 223 may be formed of (or include) a metal, or may further include a polymer injected into a metal. According to an example embodiment, the first side surface member 213 and/or the second side surface member 223 may include at least one conductive portion that is electrically segmented via at least one segmentation portion formed of the polymer. In this case, the at least one conductive portion may be used an antenna that operates in at least one band (e.g., a legacy band) by being electrically connected to a wireless communication circuit included in the electronic device 200.

According to various example embodiments, the first rear surface cover 214 and/or the second rear surface cover 224 may be formed by at least one of or by a combination of at least two of, for example, coated or colored glass, ceramic, polymer, and metal (e.g., aluminum, stainless steel (STS), or magnesium).

According to various example embodiments, the foldable display 400 may be disposed extending to at least a portion of the third surface 221 of the second housing 220, across the hinge part (e.g., the hinge part 240 of FIG. 2B), from the first surface 211 of the first housing 210. For example, the foldable display 400 may include a first portion 230a substantially corresponding to the first surface 211, a second portion 230b corresponding to the third surface 221, and a third portion 230c (e.g., a bendable region) connecting the first portion 230a to the second portion 230b and corresponding to the hinge part (e.g., the hinge part 240 of FIG. 2B). The first portion 230a and the second portion 230b may correspond to a non-bending region of the electronic device 200, while the third portion 230c may correspond to the bending region of the electronic device 200, without being limited thereto.

According to an example embodiment, the electronic device 200 may include a first protection cover 215 (e.g., a first protection frame or a first decoration member) coupled along an edge of the first housing 210. According to an example embodiment, the electronic device 200 may include a second protection cover 225 (e.g., a second protection frame or a second decoration member) coupled along an edge of the second housing 220. According to an example embodiment, the first protection cover 215 and/or the second protection cover 225 may be formed of metal or polymer. According to an example embodiment, the first protection cover 215 and/or the second protection cover 225 may be used as a decoration member. According to an example embodiment, the foldable display 400 may be positioned such that an edge of the first portion 230a (e.g., an outer edge) is interposed between the first housing 210 and the first protection cover 215. According to an example embodiment, the foldable display 400 may be positioned such that an edge (e.g., an outer edge) of the second portion 230b is interposed between the second housing 220 and the second protection cover 225. According to an example embodiment, the foldable display 400 may be positioned such that an edge of the foldable display 400 corresponding to a protection cap 235, is protected by the protection cap 235 disposed in a region corresponding to the hinge part (e.g., the hinge part 240 of FIG. 2B). Accordingly, the edge of the foldable display 400 may be substantially protected from outside.

According to an example embodiment, the electronic device 200 may include a hinge housing 241 (e.g., a hinge cover) that supports the hinge part (e.g., the hinge part 240 of FIG. 2B), is disposed to be exposed to the outside when the electronic device 200 is in the folded state, and is disposed to be invisible from the outside by being led into a first space (e.g., an internal space of the first housing 210) and a second space (e.g., an internal space of the second housing 220) when the electronic device 200 is in the flat state or the unfolded state. In an example embodiment, the foldable display 400 may be disposed extending from at least a portion of the second surface 212 to at least a portion of the fourth surface 222. In this case, the electronic device 200 may be folded such that the foldable display 400 is exposed to the outside.

According to various example embodiments, the electronic device 200 may include a sub-display 231 disposed separately from the foldable display 400. According to an example embodiment, the sub-display 231 may be disposed to be at least partially exposed through the second surface 212 of the first housing 210, thereby displaying state information of the electronic device 200 in the folded state, to replace a display function of the foldable display 400. That is, the sub-display 231 may generate and/or display an image, generate and/or emit light used for an image, etc., such that the image may be visible from outside the electronic device 200, such as through the first housing 210. According to an example embodiment, the sub-display 231 may be disposed to be exposed to the outside through at least a partial region of the first rear surface cover 214. In an example embodiment, the sub-display 231 may be disposed on the fourth surface 222 of the second housing 220. In this case, the sub-display 231 may be disposed to be exposed to the outside through at least a partial region of the second rear surface cover 224.

According to various example embodiments, the electronic device 200 may include at least one of an input device 203 (e.g., a microphone), sound output devices 201, a sensor module 204, camera devices 205 and 208, a key input device 206, and a connector port 207. In an illustrated example embodiment, the input device 203 (e.g., the microphone), the sound output devices 201, the sensor module 204, the camera devices 205 and 208, the key input device 206, or the connector port 207 may refer to a hole or a shape that is formed on the first housing 210 or the second housing 220, but may be also defined to include a main electronic component (e.g., an input device, a sound output device, a sensor module, or a camera device) that is disposed within the electronic device 200 and operates via the hole or the shape.

According to various example embodiments, the input device 203 may include at least one microphone 203 disposed on the second housing 220. In an example embodiment, the input device 203 may include a plurality of microphones 203 disposed to sense a direction of sound. In an example embodiment, the plurality of microphones 203 may be disposed at an appropriate location in the first housing 210 and/or the second housing 220. According to an example embodiment, the sound output devices 201 may include speakers 201. According to an example embodiment, the speakers 201 may include a receiver 201 for a call disposed on the first housing 210, and a speaker 202 disposed on the second housing 220. In an example embodiment, the input device 203, the sound output devices 201, and the connector port 207 may be disposed in a space provided in the first housing 210 and/or the second housing 220 of the electronic device 200, and may be exposed to an external environment via at least one hole formed in (or defined in) the first housing 210 and/or the second housing 220. According to an example embodiment, the at least one connector port 207 may be used to transmit and receive power and/or data to and from an external electronic device. In an example embodiment, the at least one connector port (e.g., a headphone jack hole) may accommodate a connector (e.g., a headphone jack) for transmitting and receiving an audio signal to and from the external electronic device. In an example embodiment, the hole formed in the first housing 210 and/or the second housing 220 may be commonly used for the input device 203 and the sound output devices 201. In an example embodiment, the sound output devices 201 may include a speaker (e.g., a piezo speaker) that operates without a hole formed in the first housing 210 and/or the second housing 220.

According to various example embodiments, the sensor module 204 may generate an electric signal or data value corresponding to an internal operational state of the electronic device 200 or an environmental state external to the electronic device 200. The sensor module 204 may detect an external environment, for example, through the first surface 211 of the first housing 210. In an example embodiment, the electronic device 200 may further include at least one sensor module disposed to detect the external environment through the second surface 212 of the first housing 210. According to an example embodiment, the sensor module 204 (e.g., an illuminance sensor) may be disposed under the foldable display 400 to detect the external environment through the foldable display 400. According to an example embodiment, the sensor module 204 may include at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, an illuminance sensor, a proximity sensor, and an ultrasonic sensor.

According to various example embodiments, the camera devices 205 and 208 may include a first camera device 205 (e.g., a front camera device) disposed on (or at) the first surface 211 of the first housing 210, and a second camera device 208 disposed on the second surface 212 of the first housing 210. The electronic device 200 may further include a flash 209 disposed near the second camera device 208. According to an example embodiment, the camera devices 205 and 208 may include a single or a plurality of lens(es), an image sensor, and/or an image signal processor. The flash 209 may include, for example, a light-emitting diode or a xenon lamp. According to an example embodiment, the camera devices 205 and 208 may be disposed such that two or more lenses (e.g., a wide-angle lens, a super-wide-angle lens, or a telephoto lens) and image sensors are positioned on one surface (e.g., the first surface 211, the second surface 212, the third surface 221, or the fourth surface 222) of the electronic device 200. In an example embodiment, the camera devices 205 and 208 may include lenses for time of flight (TOF) and/or an image sensor.

According to various example embodiments, the key input device 206 (e.g., a key button) may be disposed on the third surface 213c of the first side surface member 213 of the first housing 210. In an example embodiment, the key input device 206 may be disposed on at least one of the first side surface 213a and the second side surface 213b of the first housing 210 and the fourth side surface 223a, the fifth side surface 223b and the sixth side surface 223c of the second housing 220. In an example embodiment, the electronic device 200 may not include some or all of the key input devices 206, and the key input devices 206 that are not included in the electronic device 200 may be implemented in another form, such as a soft key, on the foldable display 400. In an example embodiment, the key input device 206 may be implemented by using a pressure sensor included in the foldable display 400.

According to various example embodiments, one (e.g., the first camera device 205) of the camera devices 205 and 208, or the sensor module 204 may be disposed to be exposed to outside the electronic device 200 through the foldable display 400. For example, the first camera device 205 or the sensor module 204 may be disposed to contact the external environment via a through hole at least partially formed in (or defined in) the foldable display 400 in the internal space of the electronic device 200. As another example, some sensor modules 204 may be disposed to perform a function and not be visible through the foldable display 400 in the internal space of the electronic device 200.

Referring to FIG. 2E, the electronic device 200 may be used to maintain an intermediate state, by operation of the hinge part (e.g., the hinge part 240 of FIG. 2B). In this case, the electronic device 200 may control the foldable display 400 to display different contents on a display region corresponding to the first surface 211 and a display region corresponding to the third surface 221. According to an example embodiment, the electronic device 200 may be used to be substantially in the flat state or the unfolded state (e.g., the flat state or the unfolded state of FIG. 2A), and/or to be substantially in the folded state (e.g., the completely folded state of FIG. 2D), based on a predetermined inflection angle (e.g., an angle formed between the first housing 210 and the second housing 220 in the intermediate state) through the hinge part (e.g., the hinge part 240 of FIG. 2B). For example, the electronic device 200 may be used to transition to the flat state or the unfolded state (e.g., the flat state or the unfolded state of FIG. 2A) when a pressing force is provided in an unfolding direction (a direction of B), while being unfolded at a predetermined inflection angle through the hinge part (e.g., the hinge part 240 of FIG. 2B). For example, the electronic device 200 may be used to transition to the folded state (e.g., the folded state of FIG. 2D) when a pressing force is provided in a folding direction (a direction of C), while being unfolded at a predetermined inflection angle through the hinge part (e.g., the hinge part 240 of FIG. 2B). In an example embodiment, the electronic device 200 may be used to maintain an unfolded state (not shown) at various angles through the hinge part (e.g., the hinge part of FIG. 2B).

Figure 3:
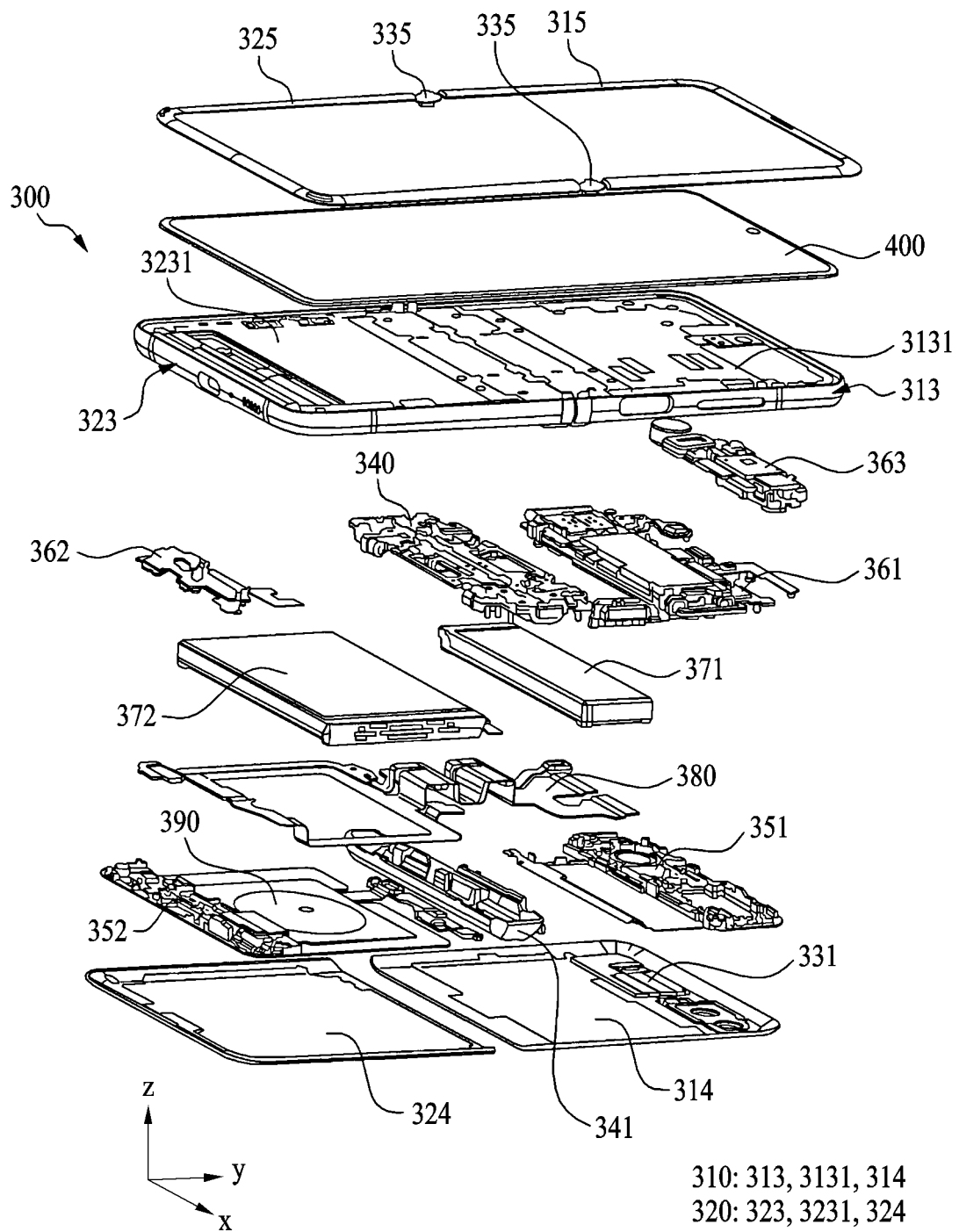
FIG. 3 is an exploded perspective view illustrating an electronic device according to an example embodiment.

FIG. 3 is an exploded perspective view illustrating an electronic device according to various example embodiments.

Referring to FIG. 3, according to various example embodiments, an electronic device 300 (e.g., the electronic device 101 of FIG. 1 or the electronic device 200 of FIG. 2A) may include a first side surface member 313 (e.g., a first side surface frame), a second side surface member 323 (e.g., a second side surface frame), and a hinge part 340 (e.g., a hinge module) that rotatably connects the first side surface member 313 to the second side surface member 323. According to an example embodiment, the electronic device 300 may include a first support member 3131 (e.g., a first support member) at least partially extending from the first side surface member 313, and a second support member 3231 at least partially extending from the second side surface member 323. According to an example embodiment, the first support member 3131 may be integrally formed with the first side surface member 313 or may be structurally coupled to the first side surface member 313. Similarly, the second support member 3231 may be integrally formed with the second side surface member 323 or may be structurally coupled to the second side surface member 323. According to an example embodiment, the electronic device 300 may include the foldable display 400 disposed to be supported by the first support member 3131 and the second support member 3231. According to an example embodiment, the electronic device 300 may include a first rear side cover 314 that is coupled to the first side surface member 313 and provides a first space between the first support member 3131 and the first rear surface cover 314, and a second rear surface cover 324 that is coupled to the second side surface member 323 and provides a second space between the second support member 3231 and the second rear surface cover 324. In an example embodiment, the first side surface member 313 and the first rear surface cover 314 may be integrally formed. In an example embodiment, the second side surface member 323 and the second rear surface cover 324 may be integrally formed.

According to an example embodiment, the electronic device 300 may include a first housing 310 (e.g., the first housing 210 of FIG. 2A or the first housing structure) that is provided by the first side surface member 313, the first support member 3131, and the first rear surface cover 314. According to an example embodiment, the electronic device 300 may include a second housing 320 (e.g., the second housing 220 of FIG. 2A or the second housing structure) that is provided by the second side surface member 323, the second support member 3231, and the second rear surface cover 324. According to an example embodiment, the electronic device 300 may include a sub-display 331 that is disposed to be visible from the outside through at least a partial region of the first rear surface cover 314.

A first space may be defined between the first side surface member 313 and the first rear surface cover 314, such as together with the first support member 3131, without being limited thereto. According to various example embodiments, the electronic device 300 may include a first substrate assembly 361 (e.g., a main printed circuit board) that is disposed in the first space between the first side surface member 313 and the first rear surface cover 314, a camera assembly 363, a first battery 371, and a first bracket 351. According to an example embodiment, the camera assembly 363 may include a plurality of camera devices (e.g., the camera devices 205 and 208 of FIGS. 2A and 2D) and may be electrically connected with the first substrate assembly 361. According to an example embodiment, the first bracket 351 may provide a support structure for supporting the first substrate assembly 361 and/or the camera assembly 363 and improved rigidity.

A second space may be defined between the second side surface member 323 and the second rear surface cover 324, such as together with the second support member 3231, without being limited thereto. According to an example embodiment, the electronic device 300 may include a second substrate assembly 362 (e.g., a sub printed circuit board) that is disposed in the second space between the second side surface member 323 and the second rear surface cover 324, an antenna 390 (e.g., a coil member), a second battery 372, and a second bracket 352. According to an example embodiment, the electronic device 300 may include a wiring member 380 (e.g., a flexible printed circuit board (FPCB)) that is disposed extending to a plurality of electronic components (e.g., the second substrate assembly 362, the second battery 372, or the antenna 390) disposed between the second side surface member 323 and the second rear surface cover 324 across the hinge part 340 from the first substrate assembly 361 and provides an electrical connection. According to an example embodiment, the antenna 390 may include a near field communication (NFC) antenna, a wireless charging antenna, and/or a magnetic secure transmission (MST) antenna. The antenna 390 may perform, for example, short-range communication with an external device, or wireless transmission and reception of required charging power.

According to various example embodiments, the electronic device 300 may include a hinge housing 341 (e.g., a hinge cover) that supports the hinge part 340 and is disposed to be exposed to the outside when the electronic device 300 is in the folded state (e.g., the folded state of FIG. 2D) and to be unvisible from the outside when the electronic device 300 is in the flat state or the unfolded state (e.g., the flat state or the unfolded state of FIG. 2A).

According to various example embodiments, the electronic device 300 may include a first protection cover 315 that is coupled along an edge of the first side surface member 313. According to an example embodiment, the electronic device 300 may include a second protection cover 325 that is coupled along an edge of the second side surface member 323. According to an example embodiment, an edge of a first planar portion (e.g., the first portion 230a of FIG. 2B) of the foldable display 400 may be protected by the first protection cover 315. According to an example embodiment, an edge of a second planar portion (e.g., the second portion 230b of FIG. 2B) of the foldable display 400 may be protected by the second protection cover 325. According to an example embodiment, the electronic device 300 may include a protection cap 335 that is disposed to protect an edge of a third portion (e.g., the third portion 230c of FIG. 2B) corresponding to the hinge part 340 of the foldable display 400.

According to various example embodiments, the first support member 3131 and the second support member 3231 can support the foldable display 400.

Figure 4:
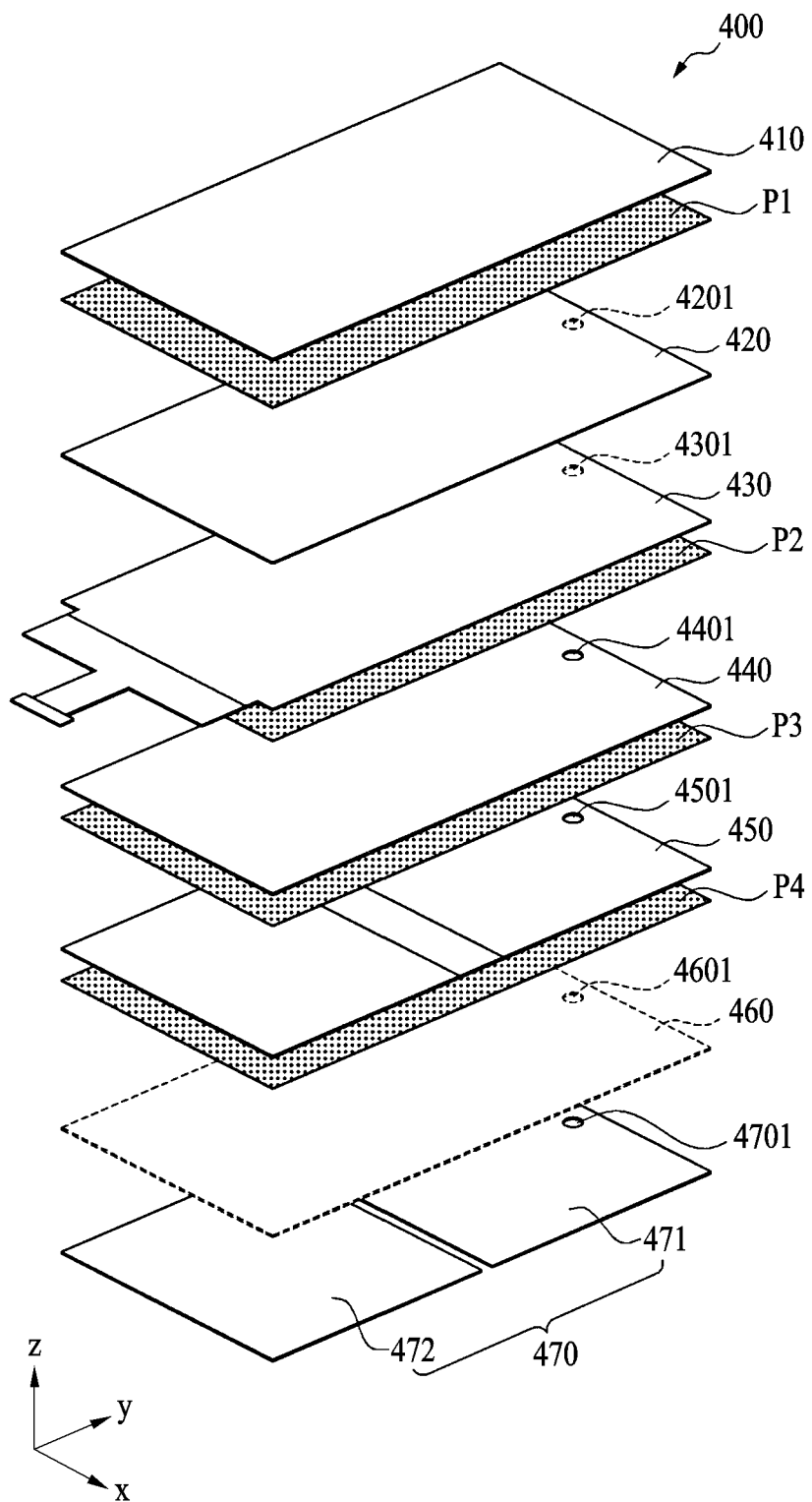
FIG. 4 is an exploded perspective view illustrating a foldable display according to an example embodiment.

FIG. 4 is an exploded perspective view illustrating a foldable display according to various example embodiments.

Referring to FIG. 4, the foldable display 400 according to various example embodiments may include an unbreakable (UB)-type organic light-emitting diode (OLED) display (e.g., a curved display). The foldable display 400 may generate and/or display an image, generate and/or emit light used for an image, etc., such that the image may be visible from outside the electronic device 200, such as through one or more of the pair of housings 210 and 220 (or pair of housing 310 and 320 in FIG. 3). The foldable display 400 may include a foldable glass 410, a polarizer 420 (e.g., a polarizing film) sequentially disposed on a rear surface of the foldable glass 410, a display panel 430, a polymer layer 440, a metal sheet layer 450, and a reinforcing plate 470. In an example embodiment, the foldable display 400 may include a digitizer 460 disposed between the polymer layer 440 and the metal sheet layer 450 or between the metal sheet layer 450 and the reinforcing plate 470.

According to various example embodiments, the foldable glass 410 may include a plurality of bridges that is disposed in a region corresponding to a bendable third portion (e.g., the third portion 230c of FIG. 2B) of the foldable display 400. The plurality of bridges may improve the flexibility of the foldable display 400. According to an example embodiment, the plurality of bridges may provide help for a smooth bending operation and reinforcing of the rigidity of the foldable glass 410. The plurality of bridges are described in detail below with reference to FIGS. 5A through 5E.

According to various example embodiments, the foldable glass 410, the polarizer 420, the display panel 430, the polymer layer 440, and the metal sheet layer 450 may be disposed across at least a portion of a first surface (e.g., the first surface 211 of FIG. 2A) of a first housing (e.g., the first housing 210 of FIG. 2A), and a third surface (e.g., the third surface 221 of FIG. 2A) of a second housing (e.g., the second housing 220 of FIG. 2A). According to an example embodiment, the reinforcing plate 470 may include a first reinforcing plate 471 that faces the first housing (e.g., the first housing 210 of FIG. 2A) and a second reinforcing plate 472 that faces the second housing (e.g., the second housing 220 of FIG. 2A). The reinforcing plate 470 may be disconnected at the bendable third portion of the foldable display 400. That is the first reinforcing plate 471 and the second reinforcing plate 472 may be disconnected from each other at a folding region of the electronic device 300 (e.g., the electronic device 101 of FIG. 1 or the electronic device 200 of FIG. 2A).

The foldable glass 410, the polarizer 420, the display panel 430, the polymer layer 440, the metal sheet layer 450 and/or the reinforcing plate 470 may be foldable together with each other. According to an example embodiment, the foldable glass 410, the polarizer 420, the display panel 430, the polymer layer 440, the metal sheet layer 450, and the reinforcing plate 470 may be attached to each other through adhesives (or glues) P1, P2, P3, and P4. For example, the adhesives P1, P2, P3, and P4 may include at least one of an optical clear adhesive (OCA), a pressure sensitive adhesive (PSA), a thermal reactive adhesive, a general adhesive, and a double-sided tape.

According to various example embodiments, the display panel 430 may include a plurality of pixels and a wiring structure (e.g., an electrode pattern). According to an example embodiment, the polarizer 420 may allow light generated from a light source of the display panel 430 and vibrating in a predetermined direction to selectively pass. According to an example embodiment, the display panel 430 and the polarizer 420 may be integrally formed. According to an example embodiment, the foldable display 400 may include a touch panel (not shown).

According to various example embodiments, the polymer layer 440 is disposed under the display panel 430, and accordingly, the polymer layer 440 may provide a dark background for securing a visibility of the display panel 430 and may be formed as a cushioning material for buffering an impact. In an example embodiment, the polymer layer 440 may be removed, or may be disposed under the metal sheet layer 450, to waterproof of the foldable display 400.

According to various example embodiments, the metal sheet layer 450 may be formed in a shape that provides flexibility to the foldable display 400. According to an example embodiment, the metal sheet layer 450 may include at least one of a steel use stainless (SUS) (e.g., a stainless steel (STS)), Cu, Al, and metal CLAD (e.g., a laminated member in which the SUS is alternately disposed with Al). In an example embodiment, the metal sheet layer 450 may include another alloy material. In an example embodiment, the metal sheet layer 450 may provide help reinforce the rigidity of an electronic device (e.g., the electronic device 101 of FIG. 1 or the electronic device 200 of FIG. 2A), may shield from ambient noise, and may be used to disperse heat emitted from an ambient heat-emitting component.

According to various example embodiments, the foldable display 400 may include a digitizer 460 as a detection member that is disposed under the metal sheet layer 450 and receives an input of an input tool such as an electronic pen (e.g., a stylus pen). For example, the digitizer 460 may include a coil member that is disposed on a dielectric substrate to detect a resonant frequency of an electromagnetic induction scheme, applied from the electronic pen.

According to various example embodiments, the foldable display 400 may include at least one functional member (not shown) that is disposed between the polymer layer 440 and the metal sheet layer 450, or under the metal sheet layer 450. According to an example embodiment, the functional member may include a graphite sheet for heat emission, a force touch flexible PCB (a force touch FPCB), a fingerprint sensor FPCB, an antenna radiator for communication, and conductive/non-conductive tape. According to an example embodiment, if the functional member is not bendable, the functional member may be individually disposed on the first housing (e.g., the first housing 210 of FIG. 2A) and the second housing (e.g., the second housing 220 of FIG. 2A). According to an example embodiment, if the functional member is bendable, the functional member may be disposed from the first housing (e.g., the first housing 210 of FIG. 2A) to at least a portion of the second housing (e.g., the second housing 220 of FIG. 2A) across a hinge part (e.g., the hinge part 240 of FIG. 2B).

According to various example embodiments, the electronic device (e.g., the electronic device 101 of FIG. 1 or the electronic device 200 of FIG. 2A) may include a camera device (e.g., the first camera device 205 of FIG. 2A) that is disposed under the foldable display 400 and detects an external environment through the foldable display 400. In an example embodiment, the electronic device (e.g., the electronic device 101 of FIG. 1 or the electronic device 200 of FIG. 2A) may include at least one sensor module (e.g., the sensor module 204 of FIG. 2A), for example, an illuminance sensor, a proximity sensor, or a TOF sensor, that is disposed under the foldable display 400. According to an example embodiment, the polarizer 420, the display panel 430, the polymer layer 440, the metal sheet layer 450, the digitizer 460, and the reinforcing plate 470 may respectively include through holes 4201, 4301, 4401, 4501, 4601, and 4701. The various through holes may correspond to and/or be aligned with each other. In an example embodiment, the display panel 430 and/or the polarizer 420 may not require through holes 4201 and 4301 through an adjustment of transmittance of a region corresponding to the through holes 4201 and 4301.

The various through holes may have a size (or dimension) in a plan view. In an example embodiment, sizes of the through holes 4201, 4301, 4401, 4501, 4601, and 4701 may be formed based on a size (e.g., planar size) of the camera device (e.g., the first camera device 205 of FIG. 2A) and/or an angle of view of the camera device (e.g., the first camera device 205 of FIG. 2A), and the sizes of the through holes 4201, 4301, 4401, 4501, 4601, and 4701 may be different from one another.

According to various example embodiments, the foldable display 400 may include a rollable-type display, a slidable-type display, or an extendible-type display, for which a display area of the foldable display 400 is changeable by rolling, sliding, extending, etc.

Figure 5A:
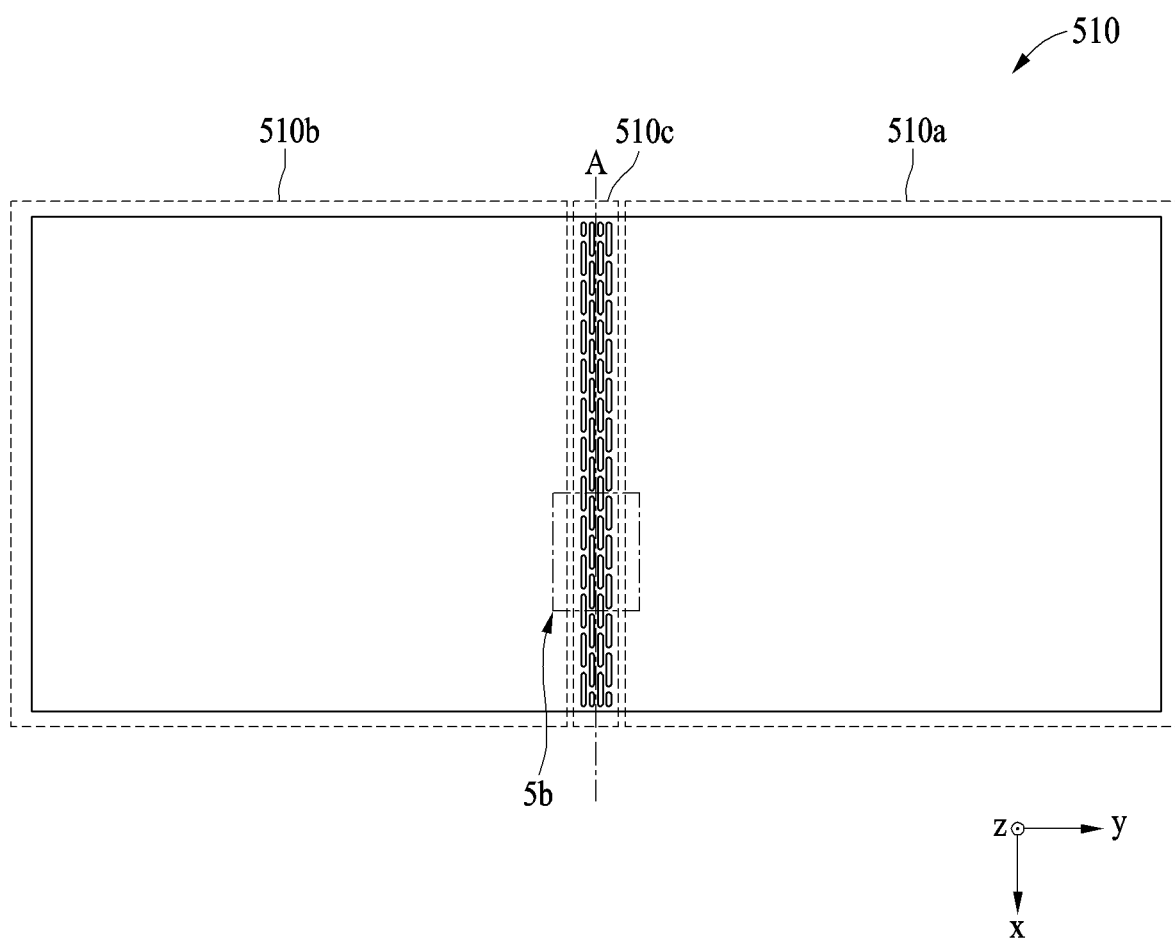
FIG. 5A is a top plan view illustrating a foldable glass according to an example embodiment.
Figure 5B:
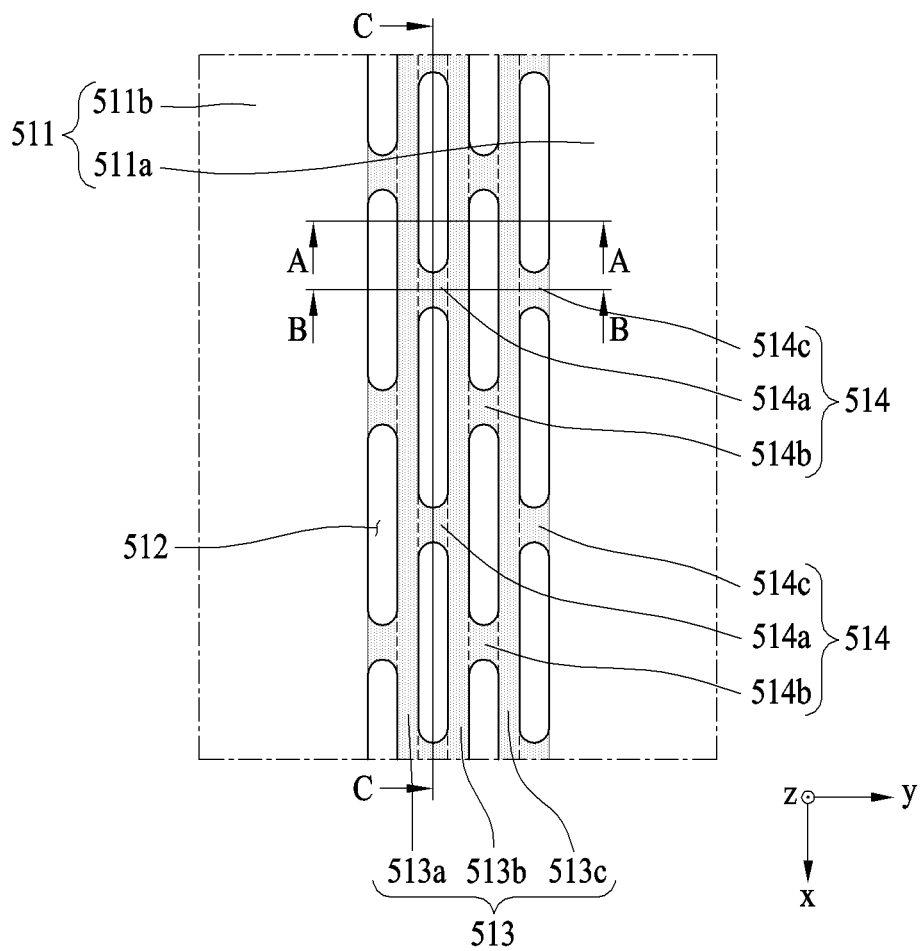
FIG. 5B is a top plan view illustrating a magnified example of region 5b of a foldable glass of FIG. 5A.
Figure 5C:
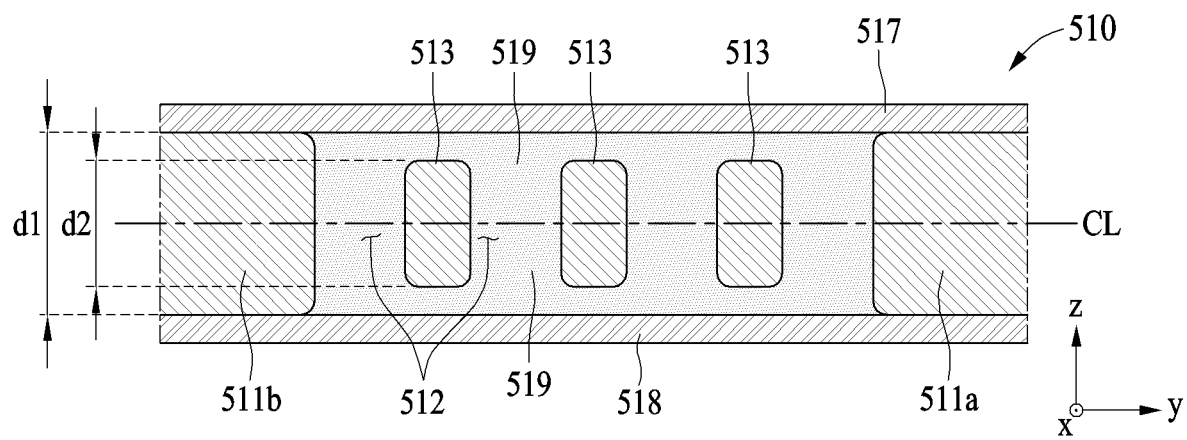
FIG. 5C is a sectional view taken along line A-A of FIG. 5B.
Figure 5D:
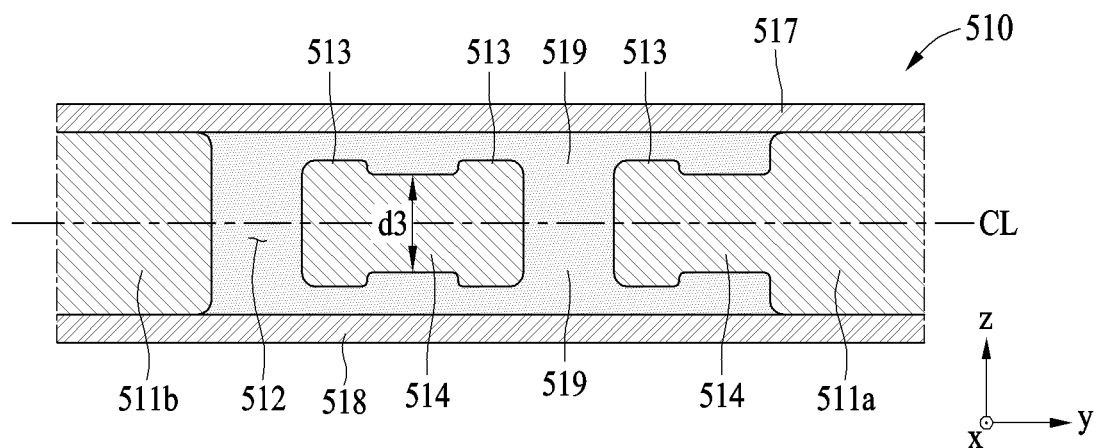
FIG. 5D is a sectional view taken along line B-B of FIG. 5B.
Figure 5E:
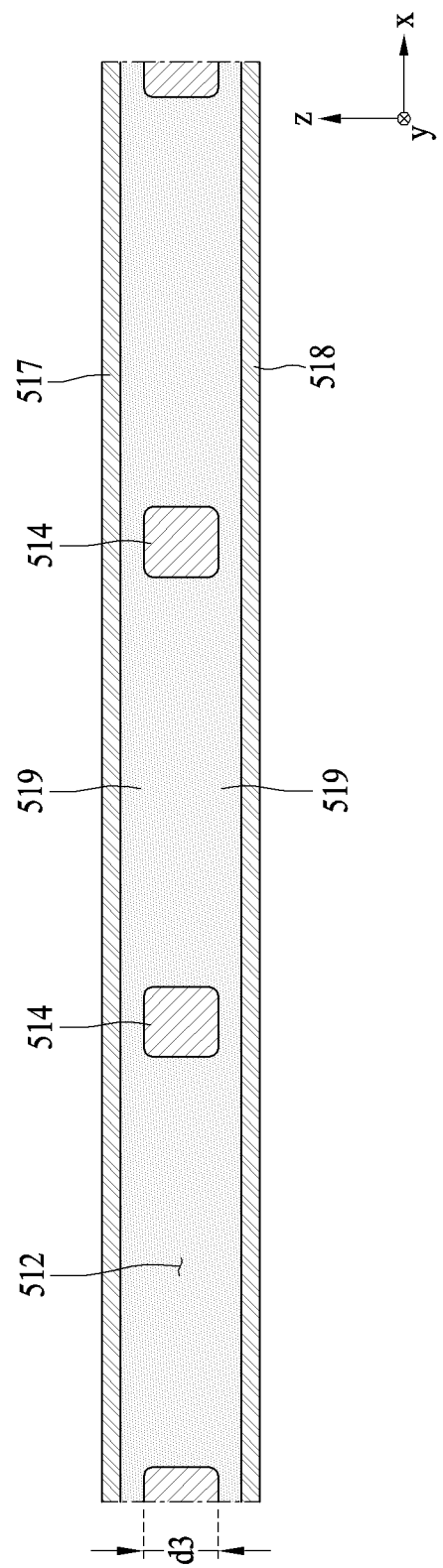
FIG. 5E is a sectional view taken along line C-C of FIG. 5B.

FIG. 5A is a top plan view illustrating a foldable glass according to various example embodiments. FIG. 5B is a top plan view illustrating a magnified example of region 5b of a foldable glass of FIG. 5A. FIG. 5C is a sectional view taken along line A-A of FIG. 5B. FIG. 5D is a sectional view taken along line B-B of FIG. 5B. FIG. 5E is a sectional view taken along line C-C of FIG. 5B. In FIGS. 5A and 5B, a protection layer and a filling part are omitted.

Referring to FIGS. 5A through 5E, according to various example embodiments, a foldable glass 510 may include a first surface facing an external direction of an electronic device (e.g., the electronic device 101 of FIG. 1 or the electronic device 200 of FIG. 2A), and a second surface opposite to the first surface and facing a display panel (e.g., the display panel 430 of FIG. 4). According to an example embodiment, the foldable glass 510 may be formed to have a thickness in a range of about 0.1 millimeter (mm) to about 1.0 mm, thereby providing help in reinforcing the rigidity of a foldable display (e.g., the foldable display 400 of FIG. 4). The foldable glass 510 may be formed to have a thickness in a range of about 0.1 mm to about 0.3 mm, for example, in a range of about 0.15 mm to about 0.21 mm.

According to various example embodiments, the foldable glass 510 may include a first region 510a facing a first portion (e.g., the first portion 230a of FIG. 2B) corresponding to a first housing (e.g., the first housing 210 of FIG. 2A) of the electronic device (e.g., the electronic device 101 of FIG. 1 or the electronic device 200 of FIG. 2A), a second region 510b facing a second portion (e.g., the second portion 230b of FIG. 2B) corresponding to a second housing (e.g., the second housing 220 of FIG. 2A), and a third region 510c facing a third portion (e.g., the third portion 230c of FIG. 2B) corresponding to a hinge part (e.g., the hinge part 240 of FIG. 2B). According to an example embodiment, the third region 510c may be deformed to be bendable together with a display panel (e.g., the display panel 430 of FIG. 4) depending on a folding operation of the electronic device (e.g., the electronic device 101 of FIG. 1 or the electronic device 200 of FIG. 2A), with respect to a folding axis.

According to various example embodiments, the foldable glass 510 may include a pair of glass bodies 511 (e.g., a first solid portion provided in plural including a pair of solid bodies) adjacent to each other along a first direction (e.g., y-axis direction), a plurality of slits 512 provided between the pair of glass bodies 511, a plurality of main bridges 513 (e.g., a second solid portion) provided between two adjacent slits among the plurality of slits 512 which are positioned adjacent to each other in a y-axis direction in which the pair of glass bodies 511 are spaced apart from one another, a plurality of sub bridges 514 (e.g., a third solid portion) connecting two adjacent main bridges 513 among the plurality of main bridges 513 or connecting the main bridge 513 to the glass body 511, a first protection layer 517 covering one surface of the pair of glass bodies 511, a second protection layer 518 covering the other surface of the pair of glass bodies 511, and a filling part 519 (e.g., filler) filled in the plurality of slits 512. The plurality of slits 512 may be formed to penetrate a thickness portion of the foldable glass 510 in a vertical direction, that is, a z-axis direction. That is, the slits 510 may be open at both upper and lower surfaces of the foldable glass 510. In an embodiment, the slits 512 may represent a recess in the foldable glass 510 at which a thickness of the foldable glass 510 is reduced as compared to a thickness at the glass bodies 511.

Based on a center line CL of the foldable glass 510, an upper region and a lower region may be in communication with each other at the plurality of slits 512. Here, the center line CL may be a virtual line extended in (or along) a y-axis direction along a center of the foldable glass 510. The center line CL may be, for example, between the first protection layer 517 and the second protection layer 518. The center line CL of the foldable glass 510 may be defined at a thickness center of an overall thickness of the foldable glass 510 at the glass bodies 511.

According to various example embodiments, the pair of glass bodies 511 may include a pair of glass bodies 511a and 511b spaced apart from one another in a first direction. In this disclosure, the first direction may be referred to as the "y-axis direction". The pair of glass bodies 511 may include a first glass body 511a provided at a location corresponding to the first region 510a, and a second glass body 511b provided at a location corresponding to the second region 510b. A third glass body may be provided at the third region 510c (e.g., main bridges 513 and sub bridges 514), and may form a foldable glass body together with the pair of glass bodies 511a and 511b. The first glass body 511a and the second glass body 511b may be opposite to each other with respect to the third region 510c (e.g., the third glass body). The first glass body 511a and the second glass body 511b may substantially have the same shape. For example, the first glass body 511a and the second glass body 511b may substantially have the same thickness. The third glass body may have the same thickness as the first and second glass bodies 511a and 511b, without being limited thereto.

In this disclosure, a thickness d1 (e.g., a first thickness) of the glass body 511 may refer to or defined by a thickness of the first glass body 511a, or the second glass body 511b. The thickness d1 may be a maximum thickness of the collective foldable glass body. The thickness d1 of the glass body 511 may be greater than a thickness d2 (e.g., a second thickness) of the main bridge 513 that is described later. A shape of the main bridge 513 may be thinner along the thickness direction, than the glass body 511.

According to various example embodiments, a thickness of the glass body 511 may be about 0.1 mm or greater.

According to various example embodiments, the plurality of main bridges 513 may be connected to each other by the plurality of sub bridges 514, or may be connected to the pair of glass bodies 511. The sub bridges 514 may alternate with the slits 512 along a second direction, such as the x-axis direction. The various portions of the foldable glass body including the glass body 511, the main bridges 513 and the sub bridges 514 may define the slits 512.

According to various example embodiments, the thickness d2 of the foldable glass body at the main bridge 513 may be less than the thickness d1 of the foldable glass body at the glass body 511. A thickness of the main bridge 513 may be less than a thickness of the glass body 511. As the thickness of the main bridge 513 is less than the thickness of the glass body 511, a magnitude of stress applied to a portion at which a slit 512 intersects with the main bridge 513 may decrease, during the folding operation of the foldable glass 510. As the thickness of the main bridge 513 is less than the thickness of the glass body 511, a magnitude of stress applied to a portion at which the main bridge 513 intersects with the sub bridge 514 may decrease, during the folding operation of the foldable glass 510, as represented by Equation 1 below. As the magnitude of stress decreases, a smaller bending outer diameter (or a bending distance) of the foldable glass 510 may be implemented. Furthermore, as the thickness of the main bridge 513 decreases, a smaller magnitude of repulsive force during the bending may be formed.

$$\sigma = 1.19814E\frac{t}{D-t} \qquad \text{[Equation 1]}$$

In Equation 1, σ may be a bending strength, 't' may be a thickness of a glass where the bending occurs, 'D' may be a bending outer diameter (or a bending distance), and 'E' may be Young's Modulus.

According to various example embodiments, along a thickness direction of the foldable glass 510, a distance between an upper surface of the main bridge 513, and the first protection layer 517, may be greater than a distance between an upper surface of the glass body 511, and the first protection layer 517, where the upper surfaces are closest to the first protection layer 517. For example, the glass body 511 may be in surface contact with the first protection layer 517 such as to form an interface therebetween, and the main bridge 513 may be spaced apart from the first protection layer 517 in a z-axis direction (e.g., thickness direction). When the glass body 511 is in surface contact with the first protection layer 517, the distance between the glass body 511 and the first protection layer 517 may be "0". Even if the main bridge 513 is spaced apart from the first protection layer 517, the filling part 519 is filled in a space between the first protection layer 517 and the second protection layer 518, and accordingly, a phenomenon that the first protection layer 517 is deformed downward by an external force may be prevented.

According to various example embodiments, the main bridge 513 may have an elongated shape in a plan view. A longitudinal direction of each of the main bridges 513 which is defined by a major dimension of the main bridges 513, may be formed (or provide) in a second direction intersecting with the y-axis direction which is the first direction. In this disclosure, the second direction may be referred to as the "x-axis direction". For example, a length of the main bridge 513 in the x-axis direction may be the same as an overall length of the glass body 511 in the x-axis direction.

According to various example embodiments, the main bridge 513 may be formed to have a thickness which is symmetrical with respect to the center line CL. A thickness portion of the main bridges 513 from the center line CL in a +z direction may be substantially the same as a thickness portion of the main bridges 513 from the center line CL in a −z direction. Also, in an embodiment, the main bridge 513 may be formed to be vertically asymmetrical with respect to the center line CL.

According to various example embodiments, the plurality of main bridges 513 may include a first main bridge 513*a*, a second main bridge 513*b*, and a third main bridge 513*c* that are spaced apart from one another in (or along) the y-axis direction. However, the number of main bridges 513 is not limited thereto. For example, two, four, or more main bridges 513 may be formed.

According to various example embodiments, a top end (e.g., an upper surface closest to the first protection layer 517) and a bottom end (e.g., a lower surface closest to the second protection layer 518) of the plurality of sub bridges 514 may be spaced apart from the center line CL in the z-axis direction. The top end and the bottom end of the sub bridges 514 may be respectively adjacent to the first protection layer 517 and the second protection layer 518. A thickness d3 (e.g., a third thickness) of the sub bridge 514 may correspond to a distance from the top end adjacent to the first protection layer 517 to the bottom end adjacent to the second protection layer 518, among the sub bridges 514.

According to various example embodiments, some of the plurality of sub bridges 514 may connect two adjacent main bridges 513 among the plurality of main bridges 513, to each other. Other sub bridges 514 may connect the main bridge 513 to the glass body 511. Among the plurality of sub bridges 514, the sub bridges connecting the two adjacent main bridges 513 may be arranged to be spaced apart from one another in the x-axis direction.

According to various example embodiments, the thickness d3 of the sub bridge 514 may be less than the thickness d1 of the glass body 511. A thickness of the foldable glass body at the sub bridge 514 may be less than a thickness of the foldable glass body at the glass body 511. As the thickness d3 of the sub bridge 514 is less than the thickness d1 of the glass body 511, the magnitude of stress applied to a portion at which the main bridge 513 is connected to the sub bridge 514 may decrease, during the folding operation of the foldable glass 510.

According to various example embodiments, the thickness d3 of the sub bridge 514 may be less than the thickness d2 of the main bridge 513. A thickness of the foldable glass body at the sub bridge 514 may be less than a thickness of the foldable glass body at the main bridge 513. For example, the foldable glass 510 may include a shape that is gradually thinner toward the sub bridge 514 from the main bridge 513. A thickness of the foldable glass body decreases in a direction from the main bridge 513 to the sub bridge 514. The foldable glass 510 may include a shape that is gradually thicker toward the main bridge 513 from the sub bridge 514. Since the foldable glass 510 has a structure in which a thickness of the third region 510*c* gradually deforms, the magnitude of stress occurring during the folding operation of the foldable glass 510 may decrease.

According to various example embodiments, each of the thicknesses d1 and d2 of the main bridge 513 and the sub bridge 514 may be less than the thickness d1 of the glass body 511. The thickness d3 of the sub bridge 514 may be less than the thickness d2 of the main bridge 513.

According to various example embodiments, the sub bridge 514 may be formed to have a thickness which is vertically symmetrical with respect to the center line CL. The distance at which the top end of the sub bridge 514 is spaced apart from the center line CL in the +z direction may be substantially the same as the distance at which the bottom end of the sub bridge 514 is spaced apart from the center line CL in the −z direction.

According to various example embodiments, the plurality of sub bridges 514 may include a plurality of first sub bridges 514*a* connecting the first main bridge 513*a* to the second main bridge 513*b*, a plurality of second sub bridges 514*b* connecting the second main bridge 513*b* to the third main bridge 513*c*, and a plurality of third sub bridges 514*c* connecting the third main bridge 513*c* to the first glass body 511*a*. The plurality of sub bridges may further include sub bridges connecting the first main bridge 513*a* to the second glass body 511*b*, but the description of the corresponding sub bridges 514 may refer to the description provided for the plurality of third sub bridges 514*c*, and accordingly further description thereof is omitted.

Referring to FIG. 5B, according to various example embodiments, the plurality of sub bridges 514 may be provided intersecting with each other. Any one of the plurality of first sub bridges 514*a* may be provided between two adjacent second sub bridges 514*b* among the plurality of second sub bridges 514*b*. For example, the first sub bridge 514*a* and the second sub bridge 514*b* may not overlap with each other in the y-axis direction. The first sub bridge 514*a* and the third sub bridge 514*c* that are provided opposite to each other with respect to the second sub bridge 514*b* may overlap with each other in the y-axis direction.

According to various example embodiments, the pair of glass bodies 511, the main bridge 513, and the sub bridge 514 may be formed of substantially the same material. For example, the pair of glass bodies 511, the main bridge 513, and the sub bridge 514 may be formed by polishing or an etching a plate-shaped glass. For example, different thicknesses may be implemented where the polishing or the etching is not performed for the plate-shaped glass at locations corresponding to the pair of the glass bodies 511, and the polishing or the etching is performed for the plate-shaped glass at locations corresponding to the bridges.

According to various example embodiments, an edge of each of the pair of glass bodies 511, the main bridge 513, and the sub bridge 514 may be processed to taper or curve, thereby reducing the visibility of the edge thereof from the outside. The edge may be provided in plural including an outer edge, and inner edges at each of the slits 512. Inner edges may be defined by the bridge portions of the foldable glass body. An outer side surface of the glass body may define the outer edge, while inner side surfaces of the foldable glass 510 may define side surfaces of the various bridges and the slits 512.

According to various example embodiments, the first protection layer 517 may cover one surface (e.g., a first surface) of the pair of glass bodies 511. The first protection layer 517 may include, for example, polyethylene terephthalate (PET), polyimide (PI), and/or thermoplastic polyurethane (TPU). The first protection layer 517 may assist an outer surface of the foldable glass 510 to have a flat shape even though there is a difference in a height between the glass body 511 and the main bridge 513. That is, the first protection layer 517 may planarize the foldable glass body.

According to various example embodiments, the second protection layer 518 may cover the other surface of the pair of glass bodies 511 (e.g., a second surface opposite to the first surface). The second protection layer 518 may include, for example, PET, PI, and/or TPU. The second protection layer 518 may assist an outer surface of the foldable glass 510 to have a flat shape even though there is a difference in a height between the glass body 511 and the main bridge 513.

A space of the foldable glass 510 may be defined between the first and second protection layers 517 and 518, together with the various bridges and glass bodies. According to various example embodiments, the filling part 519 may be filled in a space between the first protection layer 517 and the second protection layer 518. The filling part 519 may be filled in the plurality of slits 512. The filling part 519 may include an elastic material. The filling part 519 is a material that is substantially transparent, and may be filled between the first glass body 511*a* and the second glass body 511*b* in an initial fluid form or a semi-solid form. Some of the filling part 519 may be filled in the plurality of slits 512. The filling part 519 may include a material cured over time, by irradiated light, or chemical processing. The filling part 519 may include a resin, such as silicon, urethane, or acryl. The filling part 519 may include a material having substantially the same refractive index as the pair of glass bodies 511, the main bridge 513, and the sub bridge 514.

Figure 6:
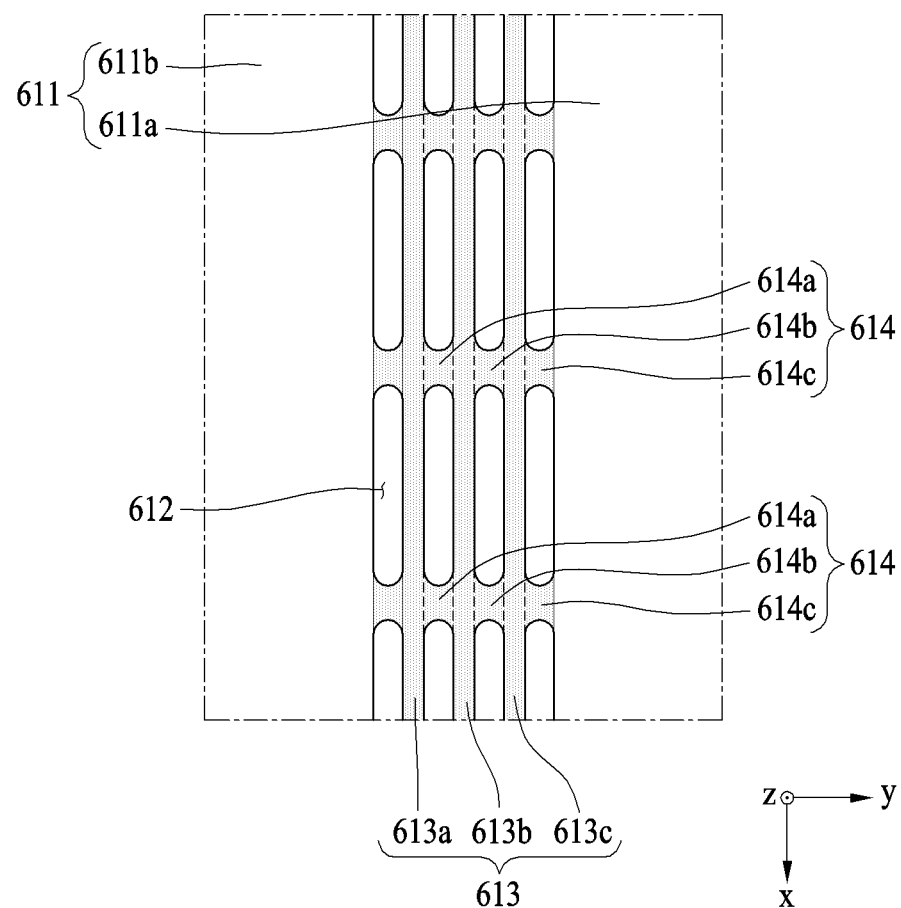
FIG. 6 is a top plan view illustrating a foldable glass according to an example embodiment.

FIG. 6 is a top plan view illustrating a foldable glass according to various example embodiments.

Referring to FIG. 6, according to various example embodiments, the foldable glass may include a pair of glass bodies 611, a plurality of slits 612, a plurality of main bridges 613, and a plurality of sub bridges 614 connecting two adjacent main bridges 613 among the plurality of main bridges 613 to each other, or connecting the main bridge 613 to the glass body 611.

According to various example embodiments, the pair of glass bodies 611 may include a first glass body 611*a* and a second glass body 611*b* that are spaced apart from one another in a y-axis direction, with a third glass body therebetween. At the third glass body, the plurality of main bridges 613 may include a first main bridge 613*a*, a second main bridge 613*b*, and a third main bridge 613*c* that are spaced apart from one another in the y-axis direction.

According to various example embodiments, the plurality of sub bridges 614 may include a plurality of first sub bridges 614*a* connecting the first main bridge 613*a* to the second main bridge 613*b*, a plurality of second sub bridges 614*b* connecting the second main bridge 613*b* to the third main bridge 613*c*, and a plurality of third sub bridges 614*c* connecting the third main bridge 613*c* to the first glass body 611*a*.

According to various example embodiments, the first sub bridges 614*a*, the second sub bridges 614*b*, and the third sub bridges 614*c* may overlap with (or be aligned with) each other in the y-axis direction.

According to various example embodiments, an electronic device 200 may include the hinge part 240, the pair of housings 210 and 220 rotatably coupled to the hinge part and foldable around the hinge part to face each other, and a foldable glass 510 disposed on the pair of housings. The foldable glass 510 may include the pair of glass bodies 511 spaced apart from one another in a first direction, the first protection layer 517 covering one surface of the pair of glass bodies, the second protection layer 518 covering the other surface of the pair of glass bodies, the plurality of slits 512 provided between the pair of glass bodies 511, the plurality of main bridges 513 provided between two adjacent slits among the plurality of slits in a direction in which the pair of glass bodies 511 are spaced apart from one another, and the plurality of sub bridges 514 connecting two adjacent main bridges among the plurality of main bridges, or connecting any one of the plurality of main bridges to the glass body.

In various example embodiments, a thickness of the foldable glass 510 at the main bridge 513 may be less than a thickness of the foldable glass 510 at each of the glass bodies 511.

In various example embodiments, a distance between the glass body 511 and the first protection layer 517 may be less than a distance between the main bridge 513 and the first protection layer 517.

In various example embodiments, a thickness of the sub bridge 514 may be less than the thickness of the glass body 511.

In various example embodiments, the thickness of the sub bridge 514 may be less than the thickness of the main bridge 513.

In various example embodiments, the main bridge 513 may be formed to be vertically symmetrical with respect to the center line CL of the foldable glass.

In various example embodiments, the sub bridge 514 may be formed to be vertically symmetrical with respect to the center line CL of the foldable glass.

In various example embodiments, a distance between the sub bridge 514 and the first protection layer may be greater than a distance between the main bridge 513 and the first protection layer.

In various example embodiments, the plurality of main bridges 513 may include the first main bridge 513*a*, the second main bridge 513*b*, and the third main bridge 513*c* that are spaced apart from one another. The plurality of sub bridges 514 may include the plurality of first sub bridges 514*a* connecting the first main bridge to the second main bridge, and the plurality of second sub bridges 514*b* connecting the second main bridge to the third main bridge.

In various example embodiments, the first sub bridge 514a may be provided between two adjacent second sub bridges 514b among the plurality of second sub bridges.

In various example embodiments, the plurality of sub bridges 514 may further include the plurality of third sub bridges 514c connecting the third main bridge to the glass body.

In various example embodiments, the first sub bridge 514a and the third sub bridge 514c may overlap with each other.

In various example embodiments, the foldable glass 510 may further include the filling part 519 filled in the plurality of slits.

In various example embodiments, a refractive index of the filling part 519 may be the same as a refractive index of the glass body.

In various example embodiments, the refractive index of the filling part 519 may be the same as the refractive index of the main bridge and the sub bridge.

According to various example embodiments, the foldable glass 510 may include the pair of glass bodies 511 spaced apart from one another in the first direction, the first protection layer 517 covering one surface of the pair of glass bodies, the second protection layer 518 covering the other surface of the pair of glass bodies, the plurality of slits 512 provided between the pair of glass bodies 511, the plurality of main bridges 513 provided between two adjacent slits, among the plurality of slits, in the direction in which the pair of glass bodies 511 are spaced apart from one another, and the plurality of sub bridges 514 connecting two adjacent main bridges among the plurality of main bridges, or connecting any one of the plurality of main bridges to the glass body.

In various example embodiments, the thickness of the main bridge 513 may be less than the thickness of the glass body 511.

In various example embodiments, the thickness of the sub bridge 514 may be less than the thickness of the glass body 511.

In various example embodiments, the main bridge 513 may be formed to be vertically symmetrical with respect to the center line CL of the foldable glass.

According to various example embodiments, the electronic device 200 may include the hinge part 240, the pair of housings 210 and 220 rotatably coupled to the hinge part and folded around the hinge part to face each other, and a foldable glass 510 disposed on the pair of housings. The foldable glass 510 may include the pair of glass bodies 511 spaced apart from one another, the plurality of slits 512 provided between the pair of glass bodies, the plurality of main bridges 513 provided between two adjacent slits, among the plurality of slits in the direction in which the pair of glass bodies are spaced apart from one another, and having a thickness less than a thickness of the glass body, and the plurality of sub bridges 514 connecting two adjacent main bridges among the plurality of main bridges, or connecting any one of the plurality of main bridges to the glass body.

What is claimed is:

1. An electronic device comprising:
    a hinge part;
    a pair of housings rotatably coupled to the hinge part and foldable around the hinge part;
    a foldable display panel facing the pair of housings and foldable together with the pair of housings; and
    a foldable glass which faces the pair of housings with the foldable display panel therebetween and is foldable together with the pair of housings,
    wherein the foldable glass comprises:
        a glass body provided in plural including a pair of glass bodies spaced apart from one another along a first direction and respectively corresponding to the pair of housings;
        a plurality of slits defined between the pair of glass bodies, each of the plurality of slits penetrating through a thickness of the foldable glass; and
        a plurality of bridges defining the plurality of slits, the plurality of bridges comprising:
            a plurality of main bridges between slits adjacent to each other along the first direction, the thickness of the foldable glass at the main bridges being less than the thickness of the foldable glass at the glass body; and
            a plurality of sub bridges connecting two adjacent main bridges among the plurality of main bridges to each other, or connecting any one of the plurality of main bridges to the glass body, the thickness of the foldable glass at the sub bridges being less than the thickness of the foldable glass at the main bridges.

2. The electronic device of claim 1, wherein within the foldable glass:
    each of the glass body and the main bridges has an upper surface which is furthest from the pair of housings, and
    the upper surface of the main bridges is spaced apart from the upper surface of the glass body and closer to the pair of housings than the upper surface of the glass body.

3. The electronic device of claim 1, wherein the thickness of the foldable glass at the sub bridges is less than the thickness of the foldable glass at the glass body.

4. The electronic device of claim 1, wherein
    the foldable glass includes a center line corresponding to a thickness center of the glass body, and
    each of the main bridges is symmetrical with respect to the center line of the foldable glass.

5. The electronic device of claim 1, wherein
    the foldable glass includes a center line corresponding to a thickness center of the glass body, and
    each of the sub bridges is vertically symmetrical with respect to the center line of the foldable glass.

6. The electronic device of claim 1, wherein
    each of the main bridges and the sub bridges has an upper surface which is furthest from the pair of housings, and
    the upper surface of the sub bridges is spaced apart from the upper surface of the main bridges and closer to the pair of housings than the upper surface of the main bridges.

7. The electronic device of claim 1, wherein
    the plurality of main bridges comprises a first main bridge, a second main bridge and a third main bridge in order along the first direction, and
    the plurality of sub bridges comprises:
        a plurality of first sub bridges connecting the first main bridge to the second main bridge, and
        a plurality of second sub bridges connecting the second main bridge to the third main bridge.

8. The electronic device of claim 7, wherein along a second direction crossing the first direction, a first sub bridge among the first sub bridges is between two adjacent second sub bridges among the plurality of second sub bridges.

9. The electronic device of claim 7, wherein the plurality of sub bridges further comprises a plurality of third sub bridges connecting the third main bridge to the glass body.

10. The electronic device of claim 9, wherein along the first direction, the first sub bridges and the third sub bridges are aligned with each other.

11. The electronic device of claim 1, wherein the foldable glass further comprises a filler in the plurality of slits.

12. The electronic device of claim 11, wherein a refractive index of the filler is a same as a refractive index of the glass body.

13. The electronic device of claim 11, wherein a refractive index of the filler is a same as a refractive index of the main bridges and the sub bridges.

14. An electronic device comprising:
a hinge part;
a pair of housings rotatably coupled to the hinge part and foldable around the hinge part;
a foldable display panel facing the pair of housings and foldable together with the pair of housings; and
a foldable glass which faces the pair of housings with the foldable display panel therebetween and is foldable together with the pair of housings,
wherein the foldable glass comprises:
a glass body provided in plural including a pair of glass bodies spaced apart from one another along a first direction, the glass body having a thickness;
a plurality of slits defined between the pair of glass bodies, each of the plurality of slits penetrating through a thickness of the foldable glass; and
a plurality of bridges between the plurality of slits, the plurality of bridges comprising:
a plurality of main bridges which define slits adjacent to each other along the first direction; and
a plurality of sub bridges which define slits adjacent to each other along a second direction crossing the first direction,
wherein the thickness of the foldable glass at the sub bridges is less than the thickness of the foldable glass at the main bridges.

* * * * *